US008285265B2

(12) United States Patent
Wisebourt et al.

(10) Patent No.: US 8,285,265 B2
(45) Date of Patent: *Oct. 9, 2012

(54) SYSTEM AND METHOD FOR UPDATING PRESENCE INFORMATION IN INSTANT MESSAGING APPLICATIONS ON A MOBILE DEVICE

(75) Inventors: Shaul Serge Wisebourt, Waterloo (CA); Gerhard Dietrich Klassen, Waterloo (CA)

(73) Assignee: Research In Motion Limited, Waterloo (CA)

( * ) Notice: Subject to any disclaimer, the term of this patent is extended or adjusted under 35 U.S.C. 154(b) by 0 days.

This patent is subject to a terminal disclaimer.

(21) Appl. No.: 13/235,903

(22) Filed: Sep. 19, 2011

(65) Prior Publication Data

US 2012/0009908 A1 Jan. 12, 2012

Related U.S. Application Data

(63) Continuation of application No. 12/256,050, filed on Oct. 22, 2008, now Pat. No. 8,032,125.

(60) Provisional application No. 61/052,029, filed on May 9, 2008.

(51) Int. Cl.
*H04M 3/42* (2006.01)

(52) U.S. Cl. ............... 455/414.1; 455/456.1; 455/456.2; 370/401

(58) Field of Classification Search ............... 455/414.1
See application file for complete search history.

(56) References Cited

U.S. PATENT DOCUMENTS

| | | | |
|---|---|---|---|
| 6,601,012 | B1 | 7/2003 | Horvitz et al. |
| 6,987,847 | B1 | 1/2006 | Murphy et al. |
| 7,117,445 | B2 | 10/2006 | Berger |
| 7,187,935 | B1 | 3/2007 | Day |
| 7,272,662 | B2 | 9/2007 | Chesnais et al. |
| 7,395,329 | B1 | 7/2008 | Holt et al. |
| 7,640,300 | B2 | 12/2009 | Wohlgemuth et al. |
| 2002/0052225 | A1 | 5/2002 | Davis et al. |
| 2002/0055967 | A1* | 5/2002 | Coussement ................. 709/202 |
| 2002/0087704 | A1 | 7/2002 | Chesnais et al. |
| 2003/0023691 | A1 | 1/2003 | Knauerhase |
| 2004/0114557 | A1 | 6/2004 | Bryan et al. |
| 2004/0248588 | A1 | 12/2004 | Pell et al. |
| 2004/0267887 | A1 | 12/2004 | Berger et al. |
| 2007/0100981 | A1 | 5/2007 | Adamczyk et al. |

(Continued)

FOREIGN PATENT DOCUMENTS

CA 2445768 A1 11/2002

(Continued)

OTHER PUBLICATIONS

Poppe, Fabrice; Search Report from corresponding European Application No. 08167248.7; Jan. 20, 2009.
Poppe, Fabrice; Search Report from corresponding European Application No. 10159775.5; search completed May 20, 2010.

*Primary Examiner* — Charles Shedrick
(74) *Attorney, Agent, or Firm* — Brett J. Slaney; Blake, Cassels & Graydon LLP

(57) ABSTRACT

A system and method for controlling the presence status on a mobile device is provided. The method comprises determining an active notification profile for said mobile device, said active notification profile defining how said mobile device notifies of new events; determining a corresponding presence status for said active notification profile; and setting said corresponding presence status as a current presence status.

27 Claims, 15 Drawing Sheets

U.S. PATENT DOCUMENTS

| | | | |
|---|---|---|---|
| 2007/0153997 A1* | 7/2007 | Shang | 379/114.29 |
| 2008/0108330 A1 | 5/2008 | O'Neil et al. | |
| 2008/0244026 A1 | 10/2008 | Holt et al. | |
| 2009/0003362 A1 | 1/2009 | Pattabhiraman et al. | |
| 2009/0047972 A1* | 2/2009 | Neeraj | 455/456.1 |
| 2009/0055404 A1 | 2/2009 | Heiden et al. | |
| 2009/0190734 A1 | 7/2009 | White et al. | |
| 2009/0258674 A1 | 10/2009 | Groth | |
| 2009/0280843 A1 | 11/2009 | Wisebourt et al. | |
| 2010/0130180 A1* | 5/2010 | Lim | 455/414.1 |
| 2011/0183645 A1* | 7/2011 | Chawla | 455/410 |

FOREIGN PATENT DOCUMENTS

| | | |
|---|---|---|
| CA | 2580850 A1 | 3/2006 |
| CA | 2559660 A1 | 3/2007 |
| EP | 2117189 A1 | 11/2009 |
| WO | WO 03/098449 A1 | 11/2003 |
| WO | WO 2005/094021 A1 | 10/2005 |
| WO | WO 2006/026846 A1 | 3/2006 |

* cited by examiner

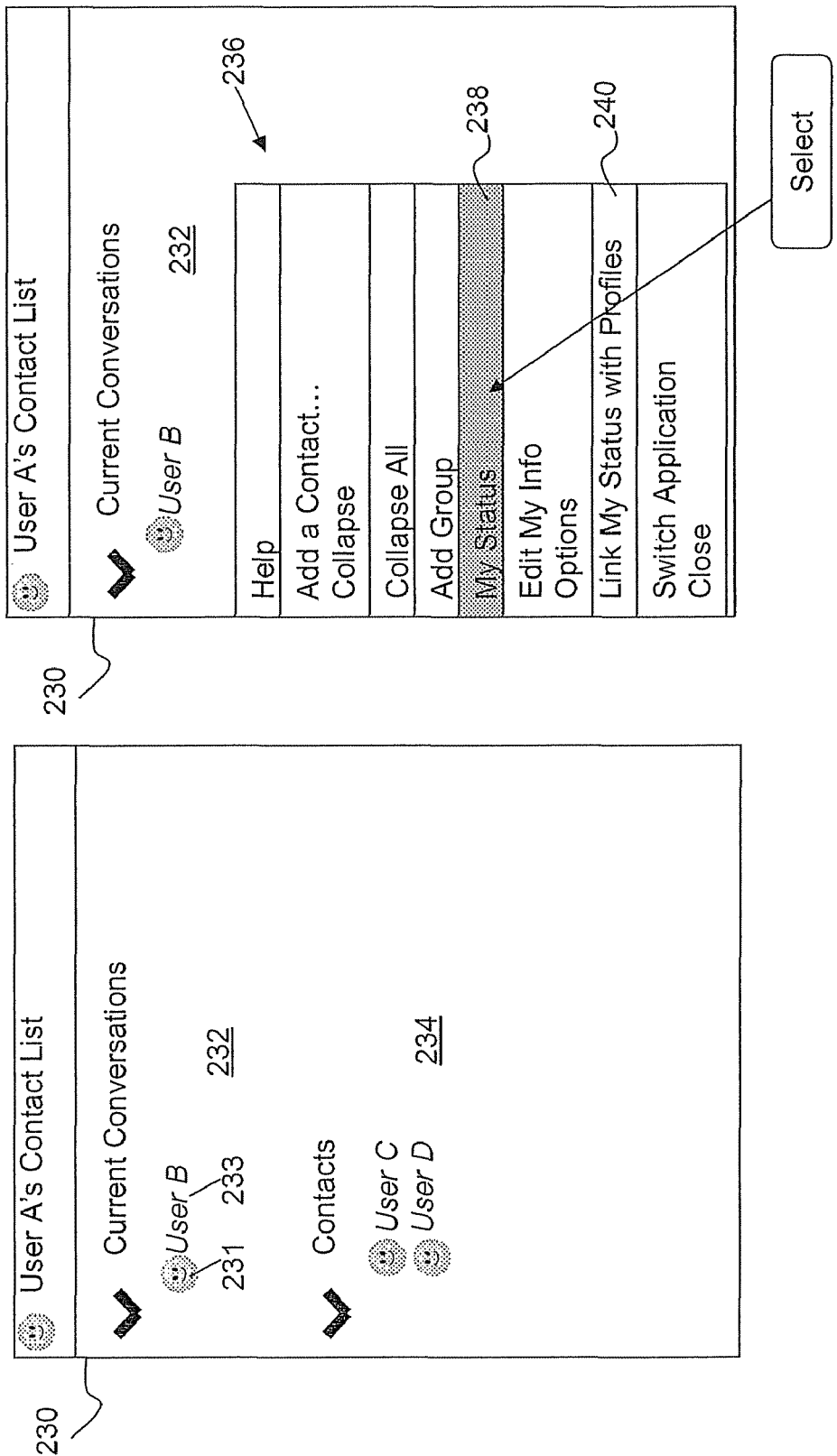

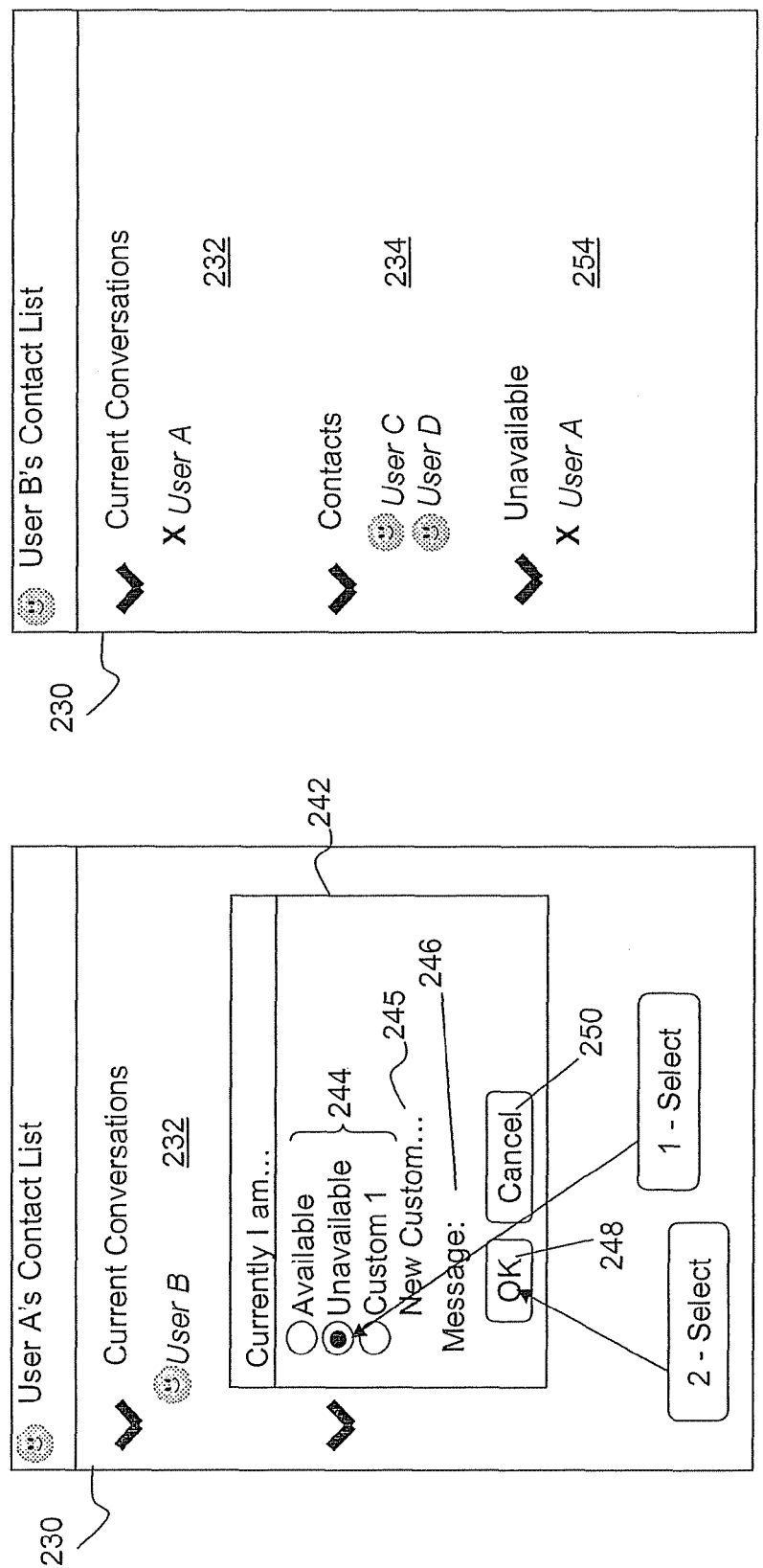

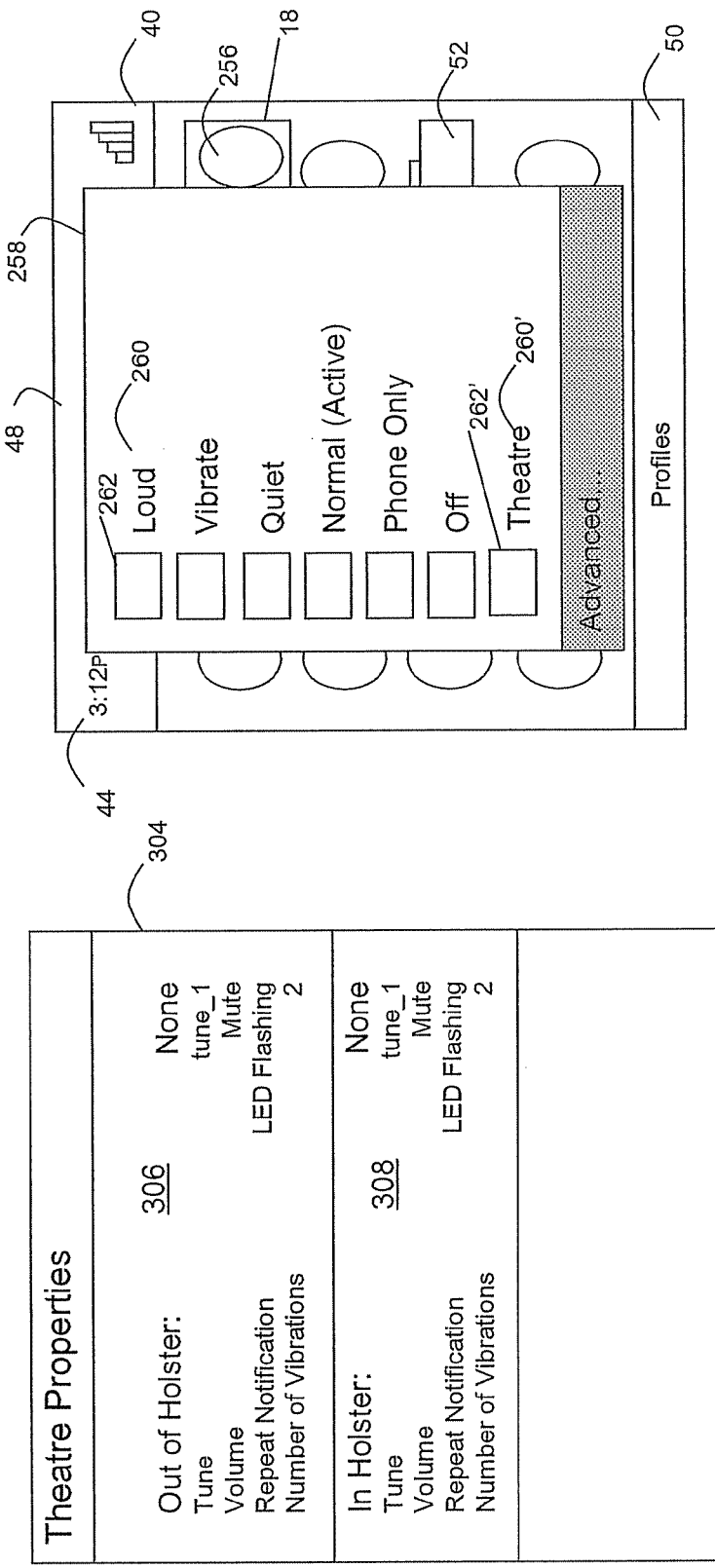

SYSTEM AND METHOD FOR UPDATING PRESENCE INFORMATION IN INSTANT MESSAGING APPLICATIONS ON A MOBILE DEVICE

CROSS REFERENCE TO RELATED APPLICATIONS

This application is a continuation of U.S. application Ser. No. 12/256,050 filed on Oct. 22, 2008 which claims priority from U.S. Application No. 61/052,029 filed on May 9, 2008, the contents of both applications being incorporated herein by reference.

TECHNICAL FIELD

The following relates to updating presence information in instant messaging applications on a mobile device.

DESCRIPTION OF THE RELATED ART

Instant messaging has become a convenient and popular way of communicating between users, whether using mobile devices, personal computers or both. An instant messaging application typically allows a user to engage in multiple conversations and the frequency of each conversation is often dictated by the availability of the users. For example, a user may wish to keep an open line of communication even when they are busy or away for a moment rather than going offline each time they wish to step away from a conversation. To facilitate this, instant messaging applications may provide an option for indicating the status or 'presence' of a user. This allows the user to indirectly notify new users coming online as well as those in existing conversations, that the user is available, unavailable, busy, etc.

Despite the ability to change and update their presence, users may either forget or not have time to update their presence status prior to engaging in another activity. Other correspondents that are currently communicating with the user would in this case be expecting responsiveness, which cannot be provided at that time. Similarly, the user may think that the other correspondents are going to be responsive when in fact they have forgotten to change their presence.

BRIEF DESCRIPTION OF THE DRAWINGS

Embodiments will now be described by way of example only with reference to the appended drawings wherein:

FIG. 9 is a screen shot of an example user interface (UI) for an instant messaging application displayed by User A.

FIG. 10 is a screen shot of the UI shown in FIG. 9 displaying a menu of options pertaining to the instant messaging application.

FIG. 11 is a screen shot of the UI shown in FIG. 9 displaying a presence option selection box upon selection of the My Status option in the menu shown in FIG. 10.

FIG. 12 is a screen shot of an example UI for an instant messaging application displayed by User B upon updating presence information for User A.

FIG. 20 is a screen shot of an example UI for the Properties option for the new profile being created as shown in FIG. 19.

FIG. 21 is a screen shot of the profiles applications as displayed after a Theatre profile has been created.

DETAILED DESCRIPTION

Figure 1:
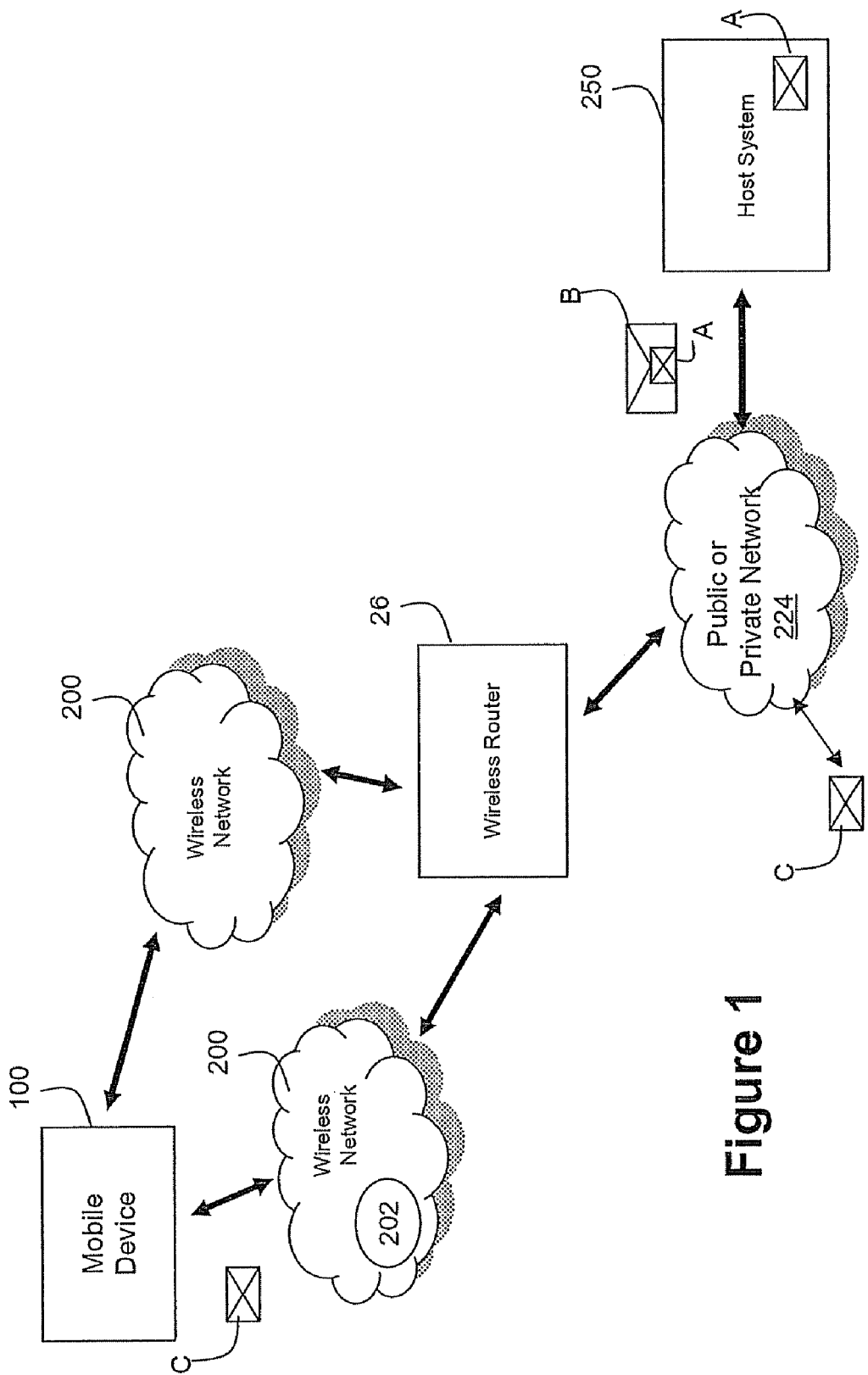
FIG. 1 is a system diagram illustrating the environment in which data items are pushed from a host system to a mobile device.

It will be appreciated that for simplicity and clarity of illustration, where considered appropriate, reference numerals may be repeated among the figures to indicate corresponding or analogous elements. In addition, numerous specific details are set forth in order to provide a thorough understanding of the embodiments described herein. However, it will be understood by those of ordinary skill in the art that the embodiments described herein may be practiced without these specific details. In other instances, well-known methods, procedures and components have not been described in detail so as not to obscure the embodiments described herein. Also, the description is not to be considered as limiting the scope of the embodiments described herein.

A disconnect has been recognized between the way in which users of a mobile device are notified of events and the user's status or presence in an instant messaging application can occur where such notifications are altered without a corresponding change in the instant messaging presence status.

For mobile devices which have existing notification profiles, such mobile devices can use an active notification profile in order to automatically update a user's presence status in an instant messaging application. In other words, by associating instant messaging presence statuses with existing notification profiles, as well as new notification profiles that are created, a method can be employed to detect changes in an active notification profile, determine the corresponding presence status through such associations and then automatically update instant messaging presence status information. In this way, if the active notification profile is changed due to a sudden change in environment, there is no requirement to also access the instant messaging application and change the presence status separately.

Although the following examples are presented in the context of mobile communication devices, the principles may equally be applied to other devices such as applications running on personal computers and the like where appropriate.

For clarity in the discussion below, communication devices will be commonly referred to as "mobile devices". Examples of applicable mobile devices include pagers, cellular phones, cellular smart-phones, portable gaming and entertainment devices, wireless organizers, personal digital assistants, computers, laptops, handheld wireless communication devices, wirelessly enabled notebook computers and the like.

One exemplary mobile device is a two-way communication device with advanced data communication capabilities including the capability to communicate with other mobile devices or computer systems through a network of transceiver stations. The mobile device may also have the capability to allow voice communication. Depending on the functionality provided by the mobile device, it may be referred to as a data messaging device, a two-way pager, a cellular telephone with data messaging capabilities, a wireless Internet appliance, or a data communication device (with or without telephony capabilities).

The mobile device may be one that is used in a system that is configured for continuously routing all forms of pushed information from a host system to the mobile device. One example of such a system will now be described.

Referring now to the drawings, FIG. 1 is an example system diagram showing the redirection of user data items (such as message A or C) from a corporate enterprise computer system (host system) 250 to the user's mobile device 100 via a wireless router 26. The wireless router 26 provides the wireless connectivity functionality as it acts to both abstract most of the wireless network's 200 complexities, and it also implements features necessary to support pushing data to the mobile device 100. Although not shown, a plurality of mobile devices may access data from the host system 250. In this example, message A in FIG. 1 represents an internal message sent from, e.g. a desktop computer within the host system 250, to any number of server computers in the corporate network 260 (e.g. LAN), which may, in general, include a database server, a calendar server, an E-mail server or a voice-mail server.

Message C in FIG. 1 represents an external message from a sender that is not directly connected to the host system 250, such as the user's mobile device 100, some other user's mobile device (not shown), or any user connected to the public or private network 224 (e.g. the Internet). Message C could be e-mail, voice-mail, calendar information, database updates, web-page updates or could even represent a command message from the user's mobile device 100 to the host system 250. The host system 250 may comprise, along with the typical communication links, hardware and software associated with a corporate enterprise computer network system, one or more wireless mobility agents, a TCP/IP connection, a collection of datastores, (for example a data store for e-mail could be an off-the-shelf mail server like Microsoft Exchange® Server or Lotus Notes® Server), all within and behind a corporate firewall.

The mobile device 100 may be adapted for communication within wireless network 200 via wireless links, as required by each wireless network 200 being used. As an illustrative example of the operation for a wireless router 26 shown in FIG. 1, consider a data item A, repackaged in outer envelope B (the packaged data item A now referred to as "data item (A)") and sent to the mobile device 100 from an Application Service Provider (ASP) in the host system 250. Within the ASP is a computer program, similar to a wireless mobility agent, running on any computer in the ASP's environment that is sending requested data items from a data store to a mobile device 100. The mobile-destined data item (A) is routed through the network 224, and through a firewall protecting the wireless router 26.

Although the above describes the host system 250 as being used within a corporate enterprise network environment, this is just one embodiment of one type of host service that offers push-based messages for a handheld wireless device that is capable of notifying and preferably presenting the data to the user in real-time at the mobile device when data arrives at the host system.

By offering a wireless router 26 (sometimes referred to as a "relay"), there are a number of major advantages to both the host system 250 and the wireless network 200. The host system 250 in general runs a host service that is considered to be any computer program that is running on one or more computer systems. The host service is said to be running on a host system 250, and one host system 250 can support any number of host services. A host service may or may not be aware of the fact that information is being channeled to mobile devices 100. For example an e-mail or message program 138 (see FIG. 4) might be receiving and processing e-mail while an associated program (e.g. an e-mail wireless mobility agent) is also monitoring the mailbox for the user and forwarding or pushing the same e-mail to a wireless device 100. A host service might also be modified to prepare and exchange information with mobile devices 100 via the wireless router 26, like customer relationship management software. In a third example, there might be a common access to a range of host services. For example a mobility agent might offer a Wireless Access Protocol (WAP) connection to several databases.

As discussed above, a mobile device 100 may be a handheld two-way wireless paging computer as exemplified in FIGS. 2-7, a wirelessly enabled palm-top computer, a mobile telephone with data messaging capabilities, a PDA with mobile phone capabilities, a wirelessly enabled laptop computer, a vending machine with an associated OEM radio modem, a wirelessly-enabled heart-monitoring system or, alternatively, it could be other types of mobile data communication devices capable of sending and receiving messages via a network connection. Although the system is exemplified as operating in a two-way communications mode, certain aspects of the system could be used in a "one and one-half" or acknowledgment paging environment, or even with a one-way paging system. In such limited data messaging environments, the wireless router 26 still could abstract the mobile device 100 and wireless network 200, offer push services to standard web-based server systems and allow a host service in a host system 250 to reach the mobile device 100 in many countries.

The host system 250 shown herein has many methods when establishing a communication link to the wireless router 26. For one skilled in the art of data communications the host system 250 could use connection protocols like TCP/IP, X.25, Frame Relay, ISDN, ATM or many other protocols to establish a point-to-point connection. Over this connection there are several tunneling methods available to package and send the data, some of these include: HTTP/HTML, HTTP/XML, HTTP/Proprietary, FTP, SMTP or some other proprietary data exchange protocol. The type of host systems 250 that might employ the wireless router 26 to perform push could include: field service applications, e-mail services, stock quote services, banking services, stock trading services, field sales applications, advertising messages and many others. This wireless network 200 abstraction is made possible by the wireless router 26, which implements this routing and push functionality. The type of user-selected data items being exchanged by the host could include: E-mail messages, calendar events, meeting notifications, address entries, journal entries, personal alerts, alarms, warnings, stock quotes, news bulletins, bank account transactions, field service updates, stock trades, heart-monitoring information, vending machine stock levels, meter reading data, GPS data, etc., but could, alternatively, include any other type of message that is transmitted to the host system 250, or that the host system 250 acquires through the use of intelligent agents, such as data that is received after the host system 250 initiates a search of a database or a website or a bulletin board.

The wireless router 26 provides a range of services to make creating a push-based host service possible. These networks may comprise: (1) the Code Division Multiple Access (CDMA) network, (2) the Groupe Special Mobile or the Global System for Mobile Communications (GSM) and the General Packet Radio Service (GPRS), and (3) the upcoming third-generation (3G) and fourth generation (4G) networks like EDGE, UMTS and HSDPA, LTE, Wi-Max etc. Some older examples of data-centric networks include, but are not limited to: (1) the Mobitex Radio Network ("Mobitex") and (2) the DataTAC Radio Network ("DataTAC").

To be effective in providing push services for host systems 250, the wireless router 26 may implement a set of defined functions. It can be appreciated that one could select many different hardware configurations for the wireless router 26, however, many of the same or similar set of features would likely be present in the different configurations.

Figure 3:
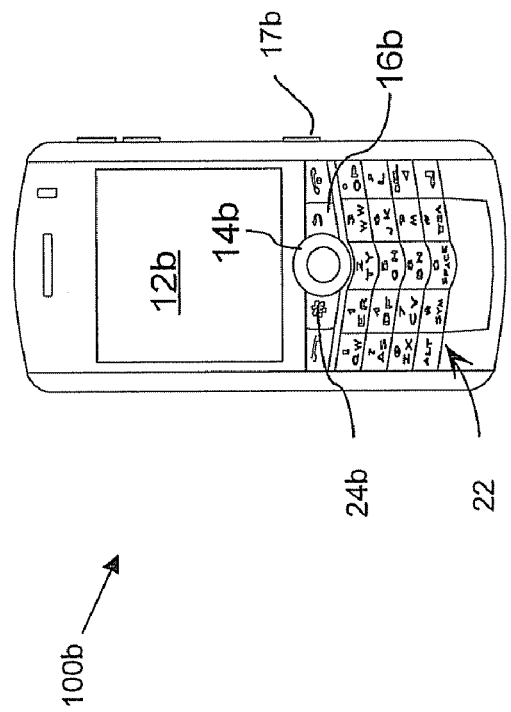
FIG. 3 is a schematic diagram of another mobile device and a display screen therefor.
Figure 2:
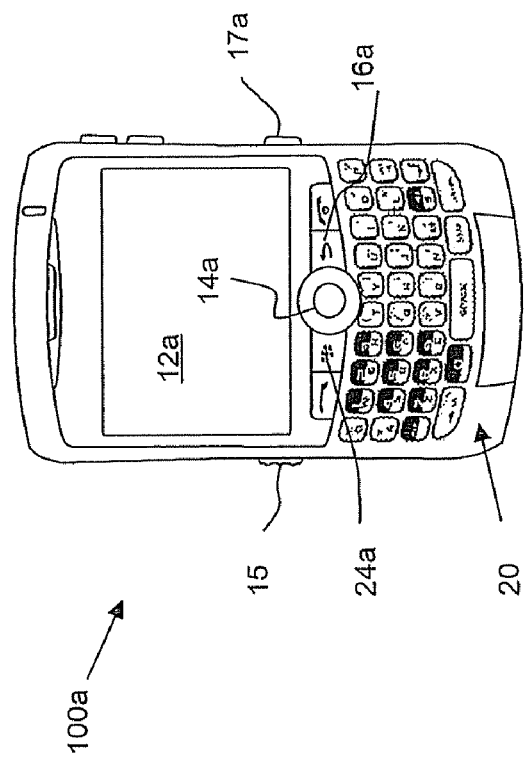
FIG. 2 is a schematic diagram of a mobile device and a display screen therefor.

Referring to FIGS. 2 and 3, one embodiment of a mobile device 100a is shown in FIG. 2, and another embodiment of a mobile device 100b is shown in FIG. 3. It will be appreciated that the numeral "100" will hereinafter refer to any mobile device 100, including the embodiments 100a and 100b, those embodiments enumerated above or otherwise. It will also be appreciated that a similar numbering convention may be used for other general features common between FIGS. 2 and 3 such as a display 12, a positioning device 14, a cancel or escape button 16, a camera button 17, and a menu or option button 24.

The mobile device 100a shown in FIG. 2 comprises a display 12a and the cursor or view positioning device 14 shown in this embodiment is a trackball 14a. Positioning device 14 may serve as another input member and is both rotational to provide selection inputs to the main processor 102 (see FIG. 4) and can also be pressed in a direction generally toward housing to provide another selection input to the processor 102. Trackball 14a permits multi-directional positioning of the selection cursor 18 (see FIG. 6) such that the selection cursor 18 can be moved in an upward direction, in a downward direction and, if desired and/or permitted, in any diagonal direction. The trackball 14a is in this example situated on the front face of a housing for mobile device 100a as shown in FIG. 2 to enable a user to manoeuvre the trackball 14a while holding the mobile device 100a in one hand. The trackball 14a may serve as another input member (in addition to a directional or positioning member) to provide selection inputs to the processor 102 and can preferably be pressed in a direction towards the housing of the mobile device 100b to provide such a selection input.

The display 12 may include a selection cursor 18 that depicts generally where the next input or selection will be received. The selection cursor 18 may comprise a box, alteration of an icon or any combination of features that enable the user to identify the currently chosen icon or item. The mobile device 100a in FIG. 2 also comprises a programmable convenience button 15 to activate a selected application such as, for example, a calendar or calculator. Further, mobile device 100a includes an escape or cancel button 16a, a camera button 17a, a menu or option button 24a and a keyboard 20. The camera button 17 is able to activate photo-capturing functions when pressed preferably in the direction towards the housing. The menu or option button 24 loads a menu or list of options on display 12a when pressed. In this example, the escape or cancel button 16a, the menu option button 24a, and keyboard 20 are disposed on the front face of the mobile device housing, while the convenience button 15 and camera button 17a are disposed at the side of the housing. This button placement enables a user to operate these buttons while holding the mobile device 100 in one hand. The keyboard 20 is, in this embodiment, a standard QWERTY keyboard.

The mobile device 100b shown in FIG. 3 comprises a display 12b and the positioning device 14 in this embodiment is a trackball 14b. The mobile device 100b also comprises a menu or option button 24b, a cancel or escape button 16b, and a camera button 17b. The mobile device 100b as illustrated in FIG. 3, comprises a reduced QWERTY keyboard 22. In this embodiment, the keyboard 22, positioning device 14b, escape button 16b and menu button 24b are disposed on a front face of a mobile device housing. The reduced QWERTY keyboard 22 comprises a plurality of multi-functional keys and corresponding indicia including keys associated with alphabetic characters corresponding to a QWERTY array of letters A to Z and an overlaid numeric phone key arrangement.

It will be appreciated that for the mobile device 100, a wide range of one or more positioning or cursor/view positioning mechanisms such as a touch pad, a positioning wheel, a joystick button, a mouse, a touchscreen, a set of arrow keys, a tablet, an accelerometer (for sensing orientation and/or movements of the mobile device 100 etc.), or other whether presently known or unknown may be employed. Similarly, any variation of keyboard 20, 22 may be used. It will also be appreciated that the mobile devices 100 shown in FIGS. 1 and 2 are for illustrative purposes only and various other mobile devices 100 are equally applicable to the following examples. For example, other mobile devices 100 may include the trackball 14b, escape button 16b and menu or option button 24 similar to that shown in FIG. 3 only with a full or standard keyboard of any type. Other buttons may also be disposed on the mobile device housing such as colour coded "Answer" and "Ignore" buttons to be used in telephonic communications. In another example, the display 12 may itself be touch sensitive thus itself providing an input mechanism in addition to display capabilities. Furthermore, the housing for the mobile device 100 should not be limited to the single-piece configurations shown in FIGS. 2 and 3, other configurations such as clamshell or "flip-phone" configurations are also applicable.

To aid the reader in understanding the structure of the mobile device 100 and how it communicates with the wireless network 200, reference will now be made to FIGS. 4 through 7.

Figure 4:
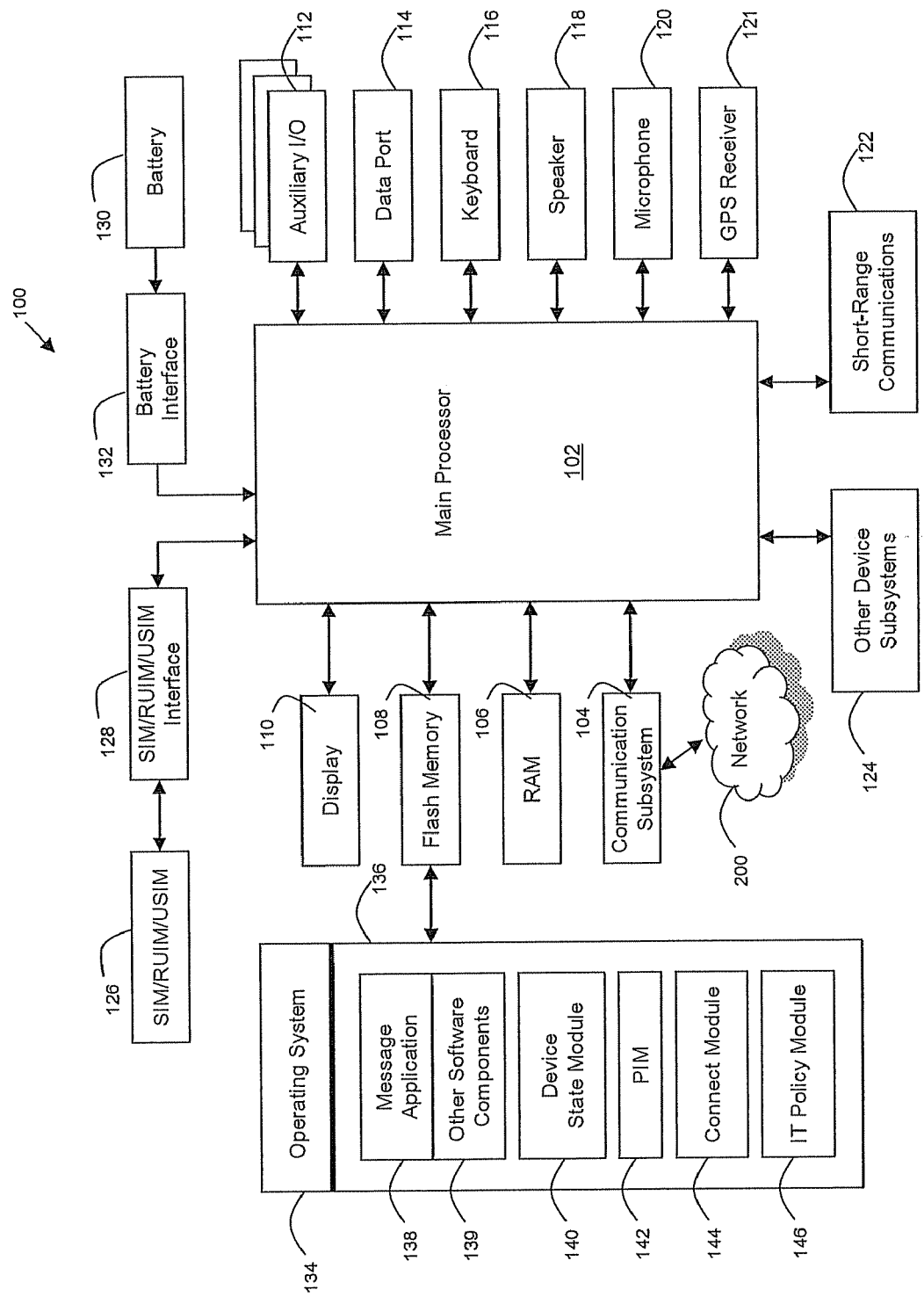
FIG. 4 is a block diagram of an exemplary embodiment of a mobile device.

Referring first to FIG. 4, shown therein is a block diagram of an exemplary embodiment of a mobile device 100. The mobile device 100 comprises a number of components such as a main processor 102 that controls the overall operation of the mobile device 100. Communication functions, including data and voice communications, are performed through a communication subsystem 104. The communication subsystem 104 receives messages from and sends messages to a wireless network 200. In this exemplary embodiment of the mobile device 100, the communication subsystem 104 is configured in accordance with the Global System for Mobile Communication (GSM) and General Packet Radio Services (GPRS) standards, which is used worldwide. Other communication configurations that are equally applicable are the 3G and 4G networks such as EDGE, UMTS and HSDPA, LTE, Wi-Max etc. New standards are still being defined, but it is believed that they will have similarities to the network behaviour described herein, and it will also be understood by persons skilled in the art that the embodiments described herein are intended to use any other suitable standards that are developed in the future. The wireless link connecting the communication subsystem 104 with the wireless network 200 represents one or more different Radio Frequency (RF) channels, operating according to defined protocols specified for GSM/GPRS communications.

The main processor 102 also interacts with additional subsystems such as a Random Access Memory (RAM) 106, a flash memory 108, a display 110, an auxiliary input/output (I/O) subsystem 112, a data port 114, a keyboard 116, a speaker 118, a microphone 120, a GPS receiver 121, short-range communications 122, and other device subsystems 124.

Some of the subsystems of the mobile device 100 perform communication-related functions, whereas other subsystems may provide "resident" or on-device functions. By way of example, the display 110 and the keyboard 116 may be used for both communication-related functions, such as entering a text message for transmission over the network 200, and device-resident functions such as a calculator or task list.

The mobile device 100 can send and receive communication signals over the wireless network 200 after required network registration or activation procedures have been completed. Network access is associated with a subscriber or user of the mobile device 100. To identify a subscriber, the mobile device 100 may use a subscriber module component or "smart card" 126, such as a Subscriber Identity Module (SIM), a Removable User Identity Module (RUIM) and a Universal Subscriber Identity Module (USIM). In the example shown, a SIM/RUIM/USIM 126 is to be inserted into a SIM/RUIM/USIM interface 128 in order to communicate with a network. Without the component 126, the mobile device 100 is not fully operational for communication with the wireless network 200. Once the SIM/RUIM/USIM 126 is inserted into the SIM/RUIM/USIM interface 128, it is coupled to the main processor 102.

The mobile device 100 is a battery-powered device and includes a battery interface 132 for receiving one or more rechargeable batteries 130. In at least some embodiments, the battery 130 can be a smart battery with an embedded microprocessor. The battery interface 132 is coupled to a regulator (not shown), which assists the battery 130 in providing power V+ to the mobile device 100. Although current technology makes use of a battery, future technologies such as micro fuel cells may provide the power to the mobile device 100.

The mobile device 100 also includes an operating system 134 and software components 136 to 146 which are described in more detail below. The operating system 134 and the software components 136 to 146 that are executed by the main processor 102 are typically stored in a persistent store such as the flash memory 108, which may alternatively be a read-only memory (ROM) or similar storage element (not shown). Those skilled in the art will appreciate that portions of the operating system 134 and the software components 136 to 146, such as specific device applications, or parts thereof, may be temporarily loaded into a volatile store such as the RAM 106. Other software components can also be included, as is well known to those skilled in the art.

The subset of software applications 136 that control basic device operations, including data and voice communication applications, may be installed on the mobile device 100 during its manufacture. Software applications may include a message application 138, a device state module 140, a Personal Information Manager (PIM) 142, a connect module 144 and an IT policy module 146. A message application 138 can be any suitable software program that allows a user of the mobile device 100 to send and receive electronic messages, wherein messages are typically stored in the flash memory 108 of the mobile device 100. A device state module 140 provides persistence, i.e. the device state module 140 ensures that important device data is stored in persistent memory, such as the flash memory 108, so that the data is not lost when the mobile device 100 is turned off or loses power. A PIM 142 includes functionality for organizing and managing data items of interest to the user, such as, but not limited to, e-mail, text messages, instant messages, contacts, calendar events, and voice mails, and may interact with the wireless network 200. A connect module 144 implements the communication protocols that are required for the mobile device 100 to communicate with the wireless infrastructure and any host system 250, such as an enterprise system, that the mobile device 100 is authorized to interface with. An IT policy module 146 receives IT policy data that encodes the IT policy, and may be responsible for organizing and securing rules such as the "Set Maximum Password Attempts" IT policy.

Other types of software applications or components 139 can also be installed on the mobile device 100. These software applications 139 can be pre-installed applications (i.e. other than message application 138) or third party applications, which are added after the manufacture of the mobile device 100. Examples of third party applications include games, calculators, utilities, etc.

The additional applications 139 can be loaded onto the mobile device 100 through at least one of the wireless network 200, the auxiliary I/O subsystem 112, the data port 114, the short-range communications subsystem 122, or any other suitable device subsystem 124.

The data port 114 can be any suitable port that enables data communication between the mobile device 100 and another computing device. The data port 114 can be a serial or a parallel port. In some instances, the data port 114 can be a USB port that includes data lines for data transfer and a supply line that can provide a charging current to charge the battery 130 of the mobile device 100.

For voice communications, received signals are output to the speaker 118, and signals for transmission are generated by the microphone 120. Although voice or audio signal output is accomplished primarily through the speaker 118, the display 110 can also be used to provide additional information such as the identity of a calling party, duration of a voice call, or other voice call related information.

Figure 5:
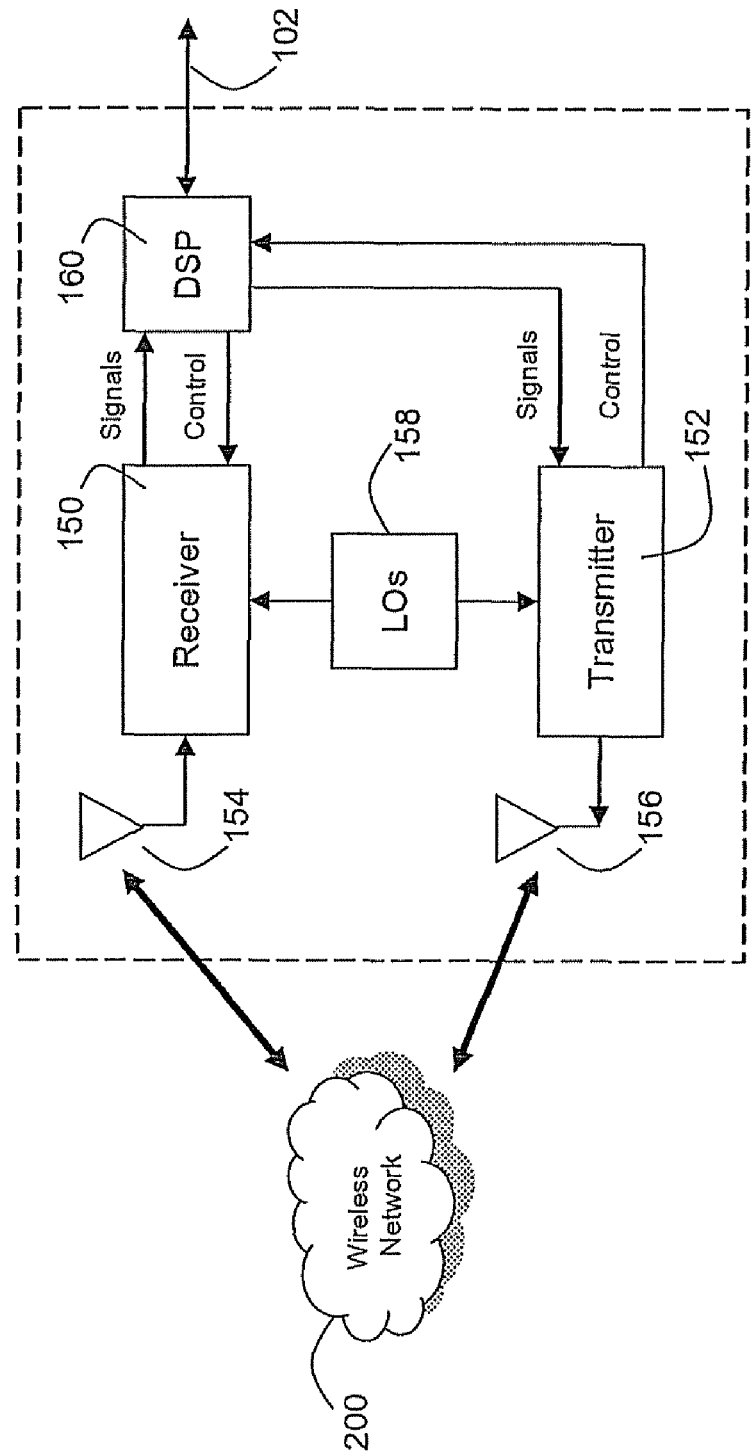
FIG. 5 is a block diagram of an exemplary embodiment of a communication subsystem component of the mobile device of FIG. 3.

Referring now to FIG. 5, an exemplary block diagram of the communication subsystem component 104 is shown. The communication subsystem 104 includes a receiver 150, a transmitter 152, as well as associated components such as one or more embedded or internal antenna elements 154 and 156, Local Oscillators (LOs) 158, and a processing module such as a Digital Signal Processor (DSP) 160. The particular design of the communication subsystem 104 is dependent upon the communication network 200 with which the mobile device 100 is intended to operate. Thus, it should be understood that the design illustrated in FIG. 5 serves only as one example.

Signals received by the antenna 154 through the wireless network 200 are input to the receiver 150, which may perform such common receiver functions as signal amplification, frequency down conversion, filtering, channel selection, and analog-to-digital (A/D) conversion. A/D conversion of a received signal allows more complex communication functions such as demodulation and decoding to be performed in the DSP 160. In a similar manner, signals to be transmitted are processed, including modulation and encoding, by the DSP 160. These DSP-processed signals are input to the transmitter 152 for digital-to-analog (D/A) conversion, frequency up conversion, filtering, amplification and transmission over the wireless network 200 via the antenna 156. The DSP 160 not only processes communication signals, but also provides for receiver and transmitter control. For example, the gains applied to communication signals in the receiver 150 and the transmitter 152 may be adaptively controlled through automatic gain control algorithms implemented in the DSP 160.

The wireless link between the mobile device 100 and the wireless network 200 can contain one or more different channels, typically different RF channels, and associated protocols used between the mobile device 100 and the wireless network 200. An RF channel is a limited resource that must be conserved, typically due to limits in overall bandwidth and limited battery power of the mobile device 100.

When the mobile device 100 is fully operational, the transmitter 152 is typically keyed or turned on only when it is transmitting to the wireless network 200 and is otherwise turned off to conserve resources. Similarly, the receiver 150 may be periodically turned off to conserve power until it is needed to receive signals or information (if at all) during designated time periods.

Figure 6:
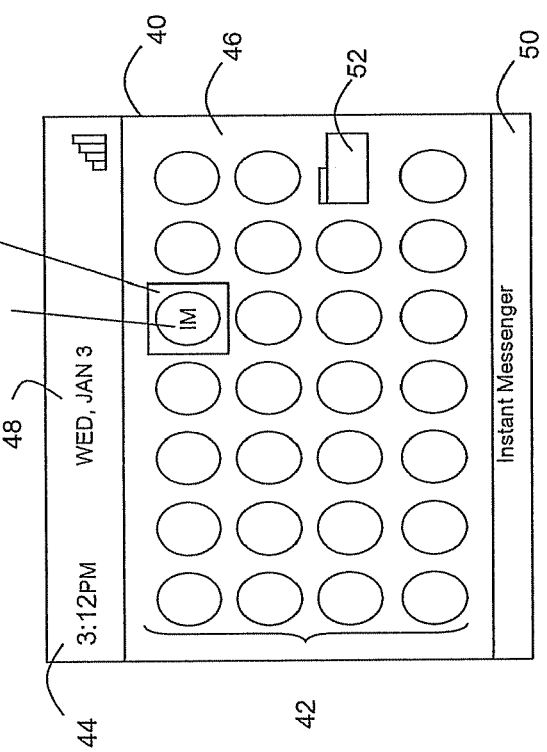
FIG. 6 is a screen shot of a home screen displayed by the mobile device.

Turning now to FIG. 6, the mobile device 100 may display a home screen 40, which may be the active screen when the mobile device 100 is powered up or may be accessible from other screens. The home screen 40 generally comprises a status region 44 and a theme background 46, which provides a graphical background for the display 12. The theme background 46 displays a series of icons 42 in a predefined arrangement on a graphical background. In some themes, the home screen 40 may limit the number icons 42 shown on the home screen 40 so as to not detract from the theme background 46, particularly where the background 46 is chosen for aesthetic reasons. The theme background 46 shown in FIG. 6 provides a grid of icons. It will be appreciated that preferably several themes are available for the user to select and that any applicable arrangement may be used. One or more of the series of icons 42 is typically a folder 52 that itself is capable of organizing any number of applications therewithin.

The status region 44 in this embodiment comprises a date/time display 48. The theme background 46, in addition to a graphical background and the series of icons 42, also comprises a status bar 50. The status bar 50 provides information to the user based on the location of the selection cursor 18, e.g. by displaying a name for the icon 53 that is currently highlighted.

An application, such as an instant messaging application 54 (see also FIG. 7) may be initiated (opened or viewed) from display 12 by highlighting a corresponding icon 53 using the positioning device 14 and providing a suitable user input to the mobile device 100. For example, instant messaging application 54 may be initiated by moving the positioning device 14 such that the icon 53 is highlighted by the selection box 18 as shown in FIG. 6, and providing a selection input, e.g. by pressing the trackball 14b.

Figure 7:
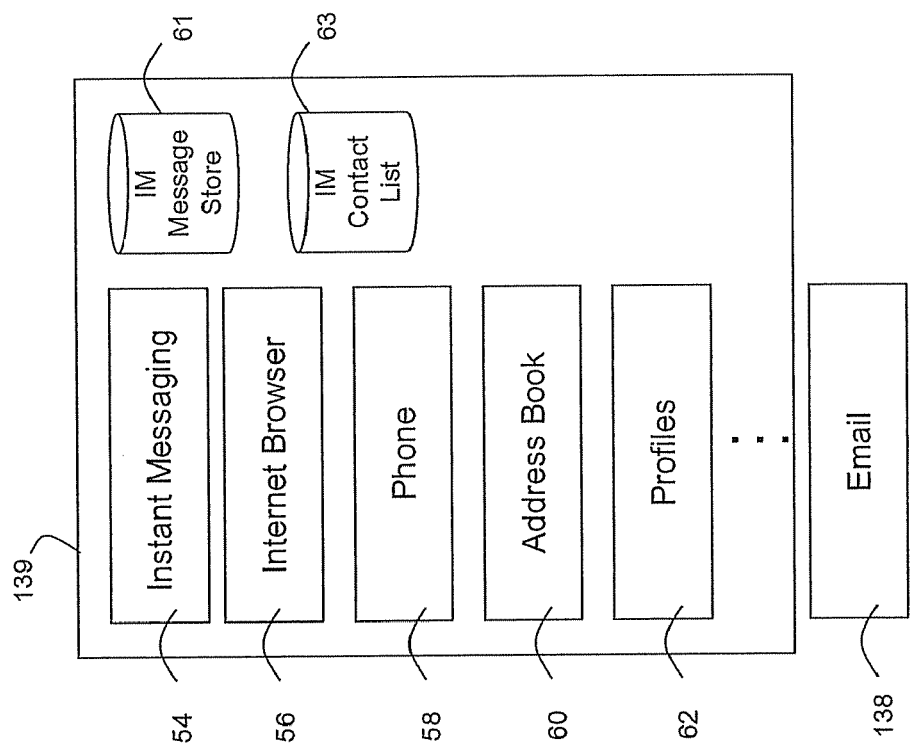
FIG. 7 is a block diagram illustrating exemplary ones of the other software applications and components shown in FIG. 4.

FIG. 7 shows an example of the other software applications and components 139 that may be stored on and used with the mobile device 100. Only examples are shown in FIG. 7 and such examples are not to be considered exhaustive. In this example, an instant messaging application 54, internet browser 56, phone application 58, address book 60 and a profiles application 62 are shown to illustrate the various features that may be provided by the mobile device 100. Also shown in FIG. 7 is the message application 138, which in the following will be referred to as an email application 138 for clarity. It will be appreciated that the various applications may operate independently or may utilize features of other applications. For example, the phone application 62 and email application 138 may use the address book 60 for contact details. Instant messaging application 54 may be implemented as a PIN-to-PIN system (where PIN refers to a personal identification number) or may be a locally installed application for use with a $3^{rd}$ party system, details of which are described below and shown in FIG. 8. As such, the mobile device 100 may facilitate the use of multiple instant messaging clients operated by respective systems.

Instant messaging application 54 comprises or otherwise has access to an instant messaging (IM) message store 61, which is used to store instant messages and instant messaging sessions or conversations, for the instant messaging application 54, each comprising one or more messages exchanged with a particular correspondent or buddy. The instant messaging application 54 also comprises or otherwise has access to an IM contact list 63, which may or may not be a subset of the contacts in the address book 60. The IM Contact List 63 comprises the buddies with which the user of the mobile device 100 can engage in an instant messaging conversation, using the system associated with the instant messaging application 54.

Figure 8:
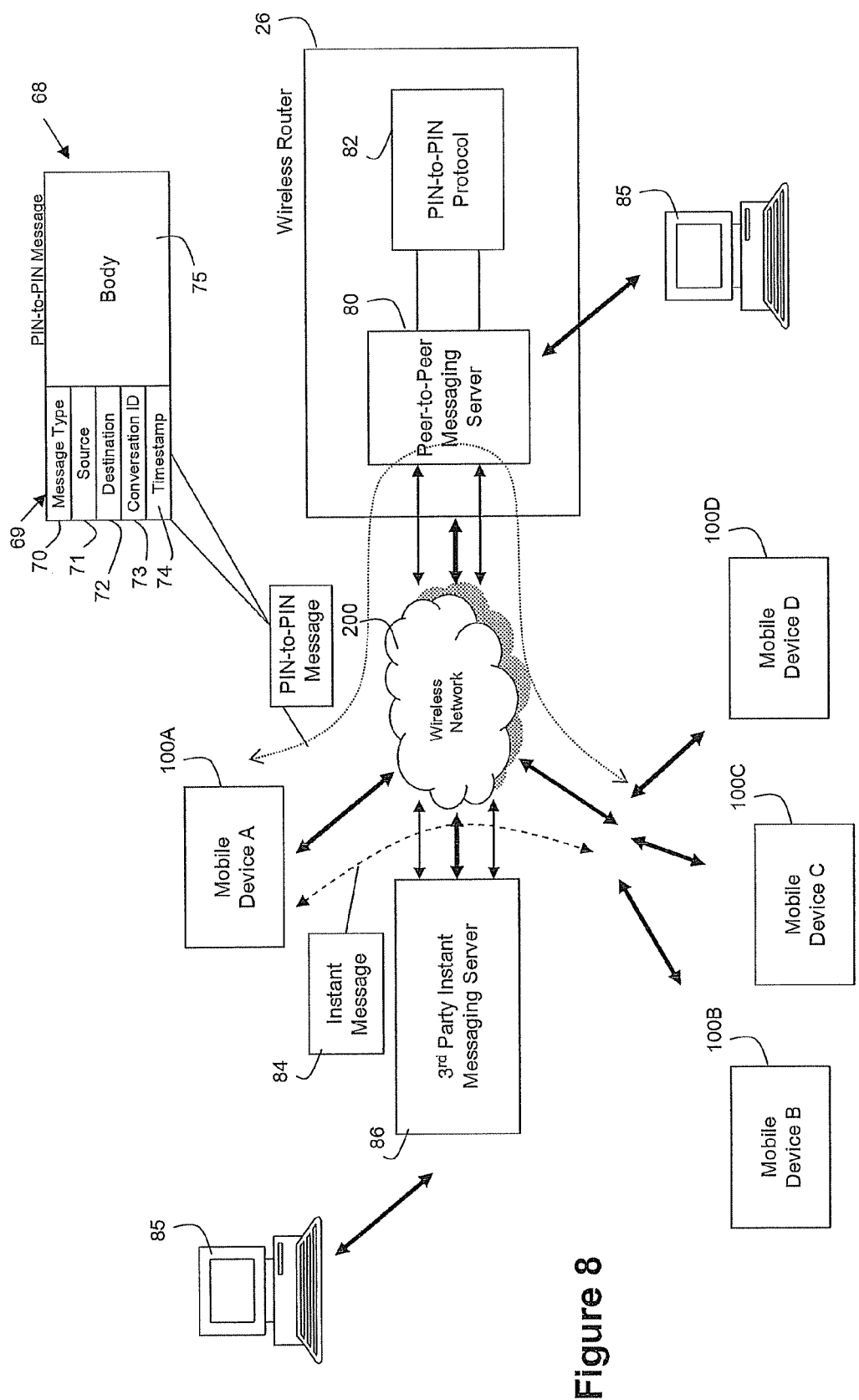
FIG. 8 is a system diagram showing one configuration for instant messaging (IM) on multiple platforms.

Turning now to FIG. 8, a configuration suitable for a user of mobile device A, hereafter referred to as mobile device 100A, to conduct instant messaging with buddies included in their IM contact list 63 is shown. FIG. 8 provides two examples of instant messaging systems are shown. A PIN-based messaging system is shown that utilizes the wireless router 26 and a $3^{rd}$ party instant messaging service is also shown that utilizes a $3^{rd}$ parry instant messaging server 86 accessed by mobile device 100A through the network 200. As can be seen, the $3^{rd}$ party instant messaging server 86 may also communicate with desktop users 85 thus facilitating instant messaging between desktop users 85 and between a mobile device user 100 and a desktop user 85. Similarly, the PIN-based messaging system may also facilitate communications with desktop users 85.

In the embodiment illustrated in FIG. 8, the PIN-based messaging system is implemented using a server-based communication infrastructure, such as one that provides email, SMS, voice, Internet and other communications. Particularly suitable for hosting a peer-to-peer messaging server 80, is the wireless router 26 used in systems such as those shown in FIG. 1. In FIG. 8, the wireless router 26 facilitates communications such as instant messaging between mobile device 100A and mobile devices for User B, User C and User D, denoted by 100B, 100C and 100D respectively. It will be appreciated that the number of users participating in the example shown in FIG. 8 is for illustrative purposes only. Instant messaging is provided by the instant messaging program 54 stored on each mobile device 100A-100D which is initiated from the home screen 40 by highlighting and selecting the instant messaging icon 53 as illustrated in FIG. 6. The wireless router 26 routes messages between the mobile devices 100A-100D according to a PIN-to-PIN protocol 82.

A PIN-to-PIN based instant message is generally denoted by numeral 68 in FIG. 8. In this embodiment, the message 68 is a PIN-based message. In a PIN-based messaging protocol 82, each message 68 has associated therewith a PIN corresponding to the mobile device 100 which has sent the message 68 (source) and includes a destination PIN identifying the intended recipient (destination). Further detail of an example structure for the messages 68 is also shown in FIG. 8. Each message 68 generally comprises a body 75, which contains the content for the message 68 (e.g. text), and a header 69, which contains various fields used for transmitting and processing each message 68. In this example, the header 69 includes a message type field 70 to specify the type of transmission (e.g. PIN, SMS etc.), a source field 71 to specify the device address for the sender, a destination field 72 to specify the device address for the intended recipient, a conversation ID field 73 to identify which conversation thread the message 68 corresponds to (e.g. such that each message 68 is identified by the conversation in which it was sent), and a timestamp field 74 to indicate the time (and if desired, the date) at which the message 68 was sent by the designated sender.

It will be appreciated that other information or attributes may be included in the message 68, such as a subject field (not shown) to enable a subject for part or all of the conversation to be transported with the message 68 (e.g. to create new subjects, modify subjects, notify others of subjects, etc.). Although not shown in FIG. 8, one or more tags can also be used to indicate to the instant messaging application 54, upon receipt of a message 68, that the message 68 has certain attributes such as a subject that is to be displayed, whether additional information is being transported (i.e. data or information in addition to the message content), or whether the message 68 is being used for some other purpose such as provisioning, synchronization, etc.

In general, in a PIN based messaging protocol 82, the sender of the message 68 knows the PIN of the intended recipient. This is preferably established when the two devices request to add each other to their respective contact or buddy lists. At the time of requesting new contacts, in traditional PIN-to-PIN protocols 82, the two respective PIN numbers may be exchanged via request e-mails which are configured to be intercepted by the respective instant messaging applications 54 so as to not appear in the message list or "inbox" of the user. In other embodiments, to avoid the exchange of email messages to add a buddy to the IM contact list 63, a global address list (GAL) application (at the host system 250—not shown) may instead be accessed in order to obtain the PIN for the intended recipient directly. Alternatively, the user may simply ask for the PIN from another user and enter it manually.

In the example shown in FIG. 8, mobile device 100A can communicate directly with any of the mobile devices 100B-100D through the peer-to-peer messaging server 80 as indicated by the short-dashed line. Instant messaging can also be accomplished through the 3$^{rd}$ party IM server 86 by sending 3$^{rd}$ party based instant messages 84 over the wireless network 200 as indicated by the long-dashed line.

When conducting a PIN-to-PIN instant messaging session according to the embodiment shown in FIG. 8, the mobile devices 100A-100D can communicate directly with the wireless router 26 in a client based exchange where, similar to other peer-to-peer programs, an intermediate server is not required. A message 68 sent by one mobile device 100 is received by the wireless router 26, which obtains the PIN number for the intended recipient from information associated with the message 324 (e.g. a data log) or from the message 324 itself. Upon obtaining the recipient's PIN according to the PIN-to-PIN protocol 82, the wireless router 26 then routes the message 68 to the recipient associated with the mobile device 100 having such a PIN. The wireless router 26 typically also provides a delivery confirmation to the original sender, which may or may not be displayed to the user. The destination device can also provide such delivery information. The wireless router 26 should be capable of routing messages 68 reliably and hold onto the messages 68 until they are successfully delivered. Alternatively, if delivery cannot be made after a certain timeout period, the wireless router 26 may provide a response indicating a failed delivery. The wireless router 26 may choose to expire a message 68 if a certain waiting period lapses.

It will also be appreciated that, as noted above, instant messaging can be implemented using any other suitable protocol such as SMS. In SMS, a message is transmitted to an SMC center (SMSC) within a carrier's infrastructure, and then delivered to the mobile phone number of the destination device. The SMSC would also be configured to hold onto messages and deliver then once the destination device is within coverage.

When conducting an instant messaging session using a 3$^{rd}$ party instant messaging application, access to the 3$^{rd}$ party instant messaging server 86 is first established and instant messages 84 exchanged over the wireless network 200 according to the appropriate protocol used by the 3$^{rd}$ party. It will be appreciated that the principles discussed below are equally applicable to both PIN-to-PIN messaging and other Internet service-based instant messaging systems hosted by such 3$^{rd}$ parties.

FIG. 9 shows an example user interface (UI) 230 for the instant messaging application 54 as displayed for User A. The UI 230 in this example organizes contacts or "buddies" into separate lists, a Current Conversations list 232, and a Contacts list 234, the lists being distinguished according to the status of User A's contacts. In this example, User A has a current conversation 98 pending with User B, as shown in the Current Conversations list 232; and two contacts are available to User A at this time, namely User C and User D, as shown in the Contacts list 234. For each contact, an name 233 and emoticon 231 or other icon may be displayed in the appropriate list according to the current status of the contact. Upon sensing selection of, for example, the menu or activity button 24, the processor 102 detects that the currently running application is the instant messaging application 54 and thus initiates and loads a corresponding instant messaging options menu 236 as shown in FIG. 10. The options menu 236 provides, among other things, a My Status option 238 for editing User A's presence information, and a Link My Status with Profiles option 240, which will be explained in greater detail later.

It will be appreciated that User A's "status" or "presence" or "availability" may refer to any mechanism by which the instant messaging application 54 enables User A to indicate to another correspondent in an instant messaging session or conversation 98 (see also FIG. 15) the likelihood that they can/will respond or if a response is unlikely. The terms "status", "presence", and "availability" may hereinafter be used interchangeably. Upon sensing selection of the My Status option 238 as shown in FIG. 10, e.g. upon placement of a highlight bar or selection cursor over the My Status Option 238 and receiving a selection input from the trackball, enter key or similar mechanism, a presence selection box 242 may be initiated and displayed by the processor 102 as shown in FIG. 11.

The presence selection box 242 provides a list 244 of presence options which, in this example includes "Available", "Unavailable" and "Custom 1". The option "Custom 1" illustrates that custom, user-defined presence statuses can be created, in addition to default presence statuses, e.g. "Available" and "Unavailable". For example, a more specific presence status such as "On the Phone" or "Busy" can be defined. A New Custom option 245 can be selected to create such a custom user-defined presence status as will be discussed later. A message can be associated with a selected one of the presence options in the list 244 by entering characters adjacent the Message identifier 246. For example, if the "Unavailable" option has been selected, an accompanying message such as "I am on the phone right now" can be entered. In this way, various options are provided for alerting other correspondents such as buddies User B, User C and User D that User A is not likely to be responsive if at all, i.e. is "unavailable" at the moment.

In the example shown in FIG. 11, by first selecting the "Unavailable" option and then selecting an OK button 248, all current conversations can be updated to reflect User A's change in presence status. It may be noted that by selecting a Cancel button 250, this operation can be discarded without updating the presence status for User A. Turning now to FIG. 12, an instant messaging application UI 230 for User B is shown, which reflects the change in presence status for User A, in this example by replacing the emoticon 231 with an "X" to indicate "unavailable". When a contact or buddy becomes unavailable, the IM application 54 may create (or make visible) a new list 254, which displays unavailable contacts. It will be appreciated that other new lists can also be created according to other presence statuses such as custom presence statuses. For example, if User A had selected "Custom 1", User B's IM application 230 could create a new "Custom 1" list (not shown).

While the instant messaging application 54 is running, it can detect a change in presence status, and the presence status updated accordingly, e.g. upon a manual selection made by the user. It can be appreciated that a user's contacts, in particular those with which they are engaged in current conversations 98, may rely on the user's presence status to ascertain the availability of the user and thus the likelihood that the user will be responsive. As such, it is beneficial for the user to change their presence status according to their availability. As discussed above, the mobile device 100 may, in addition to applications such as instant messaging 54, have existing notification profiles that can be changed using the profiles application 62. Notification profiles define how the mobile device 100 notifies the user of calendar and task reminders; and incoming messages, calls, and browser content. Consequently, this may affect the user's ability to recognize such reminders and incoming communications. Therefore, unless the user's presence status in the instant messaging application 54 is not consistent with the notification profiles, even if the user appears to be "available" in the context of instant messaging, they may in fact not be responsive when, for example, they are not alerted or "notified" by the mobile device 10.

Figure 13:
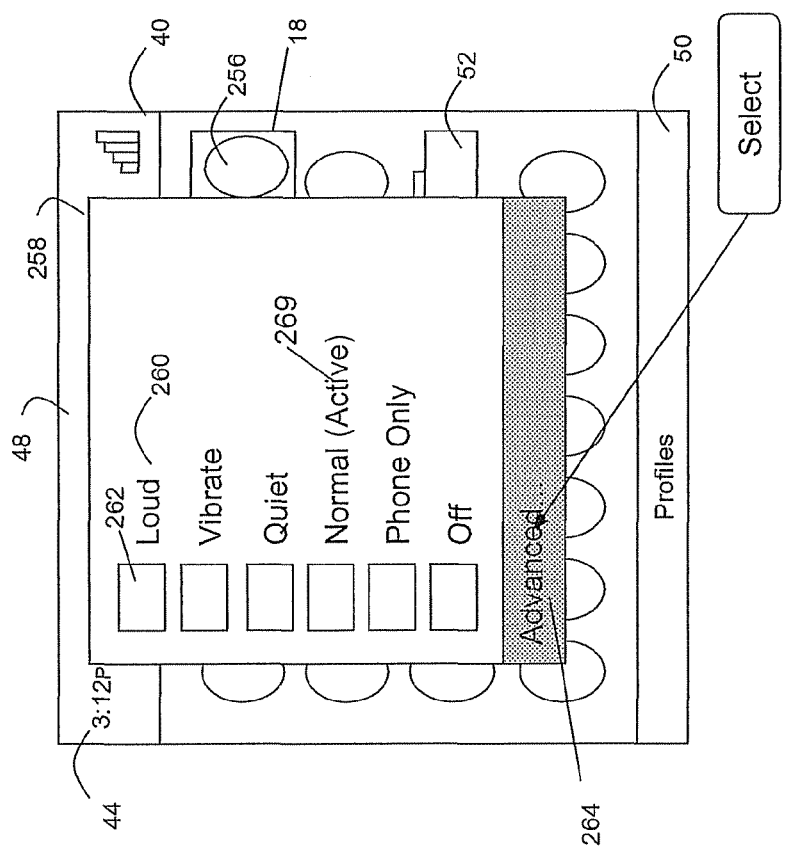
FIG. 13 is a screen shot of an example UI for a profiles application accessed from the home screen shown in FIG. 6.

Turning now to FIG. 13, a profiles UI 258 is shown, which can be initiated, loaded and displayed by the processor 102 upon receiving a suitable input. In the example shown in FIG. 13, a profiles icon 256 on the home screen 40 is highlighted using the selection cursor 18 and a selection made, e.g. using the trackball 14a, enter key, etc. In this example, the profiles UI 258 lists a set of six preloaded or default profiles 260 with corresponding icons 262 that help to distinguish visually between profiles 260 on the display 12. For example, the profiles icon 256 on the home screen 40 can be updated according to the currently selected or "active" profile 260. The active profile 260 can be marked as such, e.g. by indicating "active" 269 in parentheses. It will be appreciated that such preloaded profiles 260 can be edited to set different notification options, and new profiles 260 can be created. To modify settings, create new profiles 260, and utilize additional features associated with the profiles 260, an Advanced option 264 can be selected, which in this example is displayed at the end of the list of profiles 260.

Figure 14:
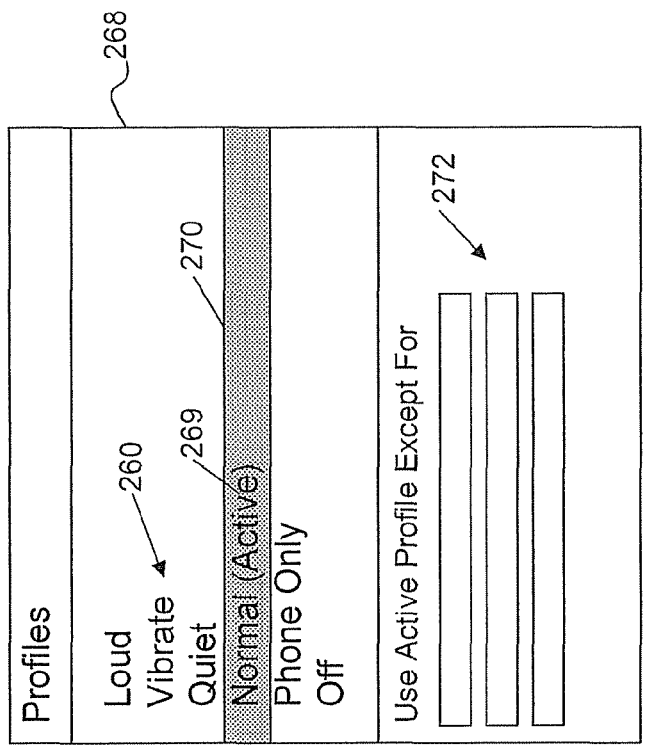
FIG. 14 is a screen of an example UI for an advanced profiles option accessed from the profiles application shown in FIG. 13.

An advanced options UI 268 for the profiles application 62 is shown in FIG. 14. In the advanced options UI 268, the same list of profiles 260 is provided and the active profile 260 can be changed by highlighting a desired one of the profiles 260 using a selection bar 270 and making a suitable selection, similar to the way in which the profiles 260 can be selected from the profiles UI 258. By selecting the menu button 24, a menu may be loaded and displayed for editing the current profiles 260, creating new profiles and, among other things, creating a new exception 272. Exceptions 272 can be created for using specific profiles in certain circumstances, regardless of the active profile 260. For example, when receiving messages from a certain contact, the "Loud" profile 260 is used, even if the active profile 260 is "Quiet", i.e. use the active profile 260 except in the specified circumstance.

It can therefore be appreciated that the user's ability to physically recognize incoming messages, such as instant messages 68, 84, can be affected by the use of notification profiles 260. For example, if either the "Quiet" or "Off" profile 260 is active, the user may be less likely to notice an incoming instant message 68, 84. If the instant messaging presence status 244 indicates that the user is "Available", the other correspondent in the conversation, e.g. User B, may assume that User A should be responsive but is avoiding or ignoring their messages—a typically undesirable scenario. As discussed above, it has been recognized that by linking or associating existing notification profiles 260 on a mobile device 100 to instant messaging presence statuses 244, and detecting changes in notification profiles 260, the instant messaging presence status 244 can be automatically updated to reflect the user's change in profile 260 and thus better reflect the user's ability to be responsive in a current instant messaging conversation 98.

For example, if User A is entering a meeting, lecture, theatre or other environment where it is prudent to quickly change their active notification profile 260 from "Normal" or "Loud" to "Quiet" or "Off", they can do so by accessing the profiles UI 258 as shown in FIG. 13 and the processor 102 will automatically change their presence status 244 to something more appropriate, e.g. "Unavailable". This avoids having to also access the instant messaging UI 230 and change the presence status 244 as shown in FIG. 11. Moreover, in embodiments where changing the notification profiles 260 is easier or more convenient than changing the presence status 244, e.g. if a short cut exists, the user is given another mechanism to update their presence status 244, which in some cases can involve fewer selections. On a mobile device 100 where managing the environment can be more difficult than, for example a desktop, the ability to intelligently manage multiple applications in the mobile environment can be an advantage to the user, in particular in situations where the mobile environment is rapidly changing, e.g. when a phone call arrives unexpectedly or when entering an environment in which the mobile device 100 can be a distraction.

Figure 15:
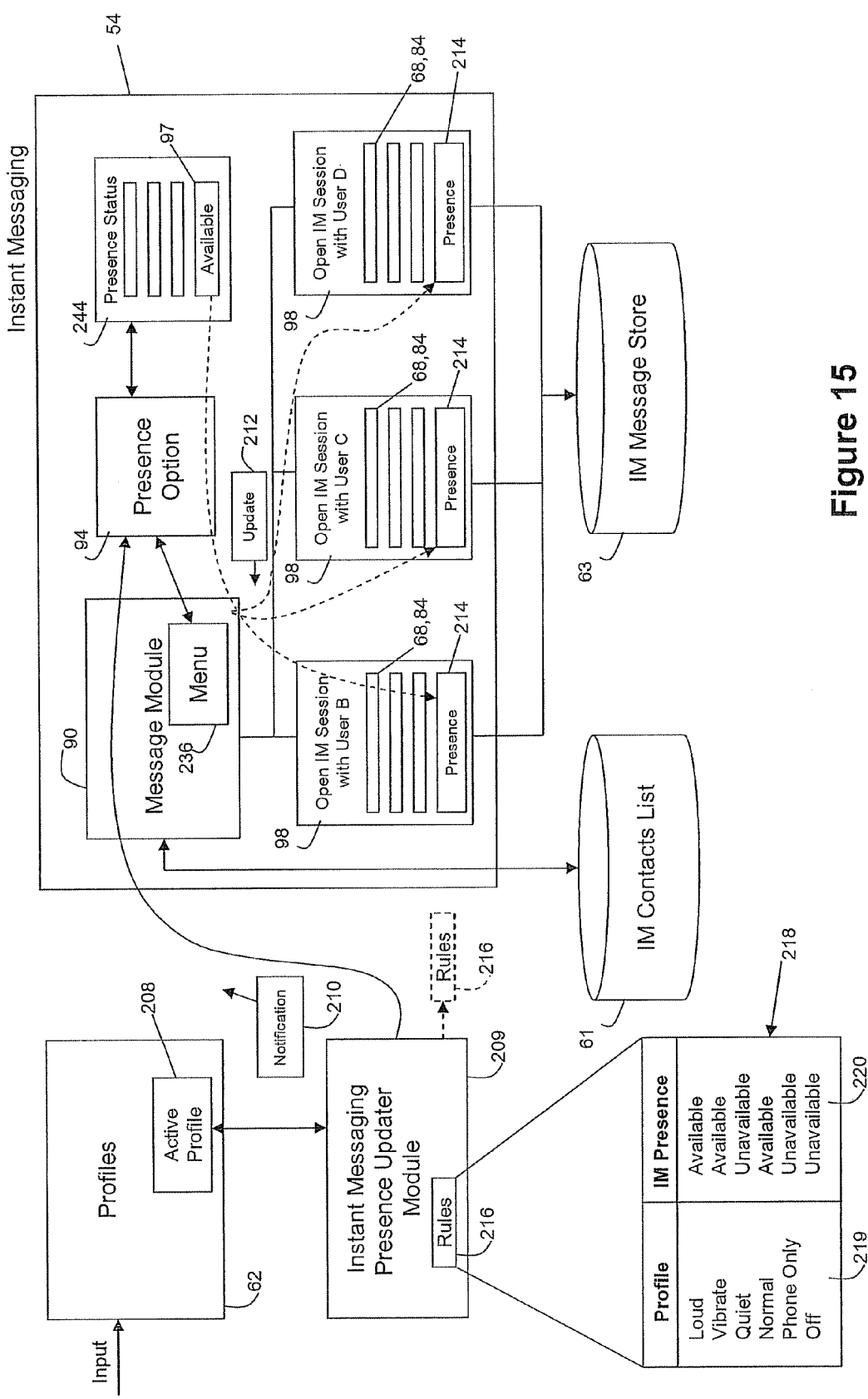
FIG. 15 is a block diagram showing further detail of an instant messaging application and an instant messaging presence detection module for updating the instant messaging application upon sensing status changes in the profiles application.

Turning now to FIG. 15, further detail of the instant messaging application 54 is shown to illustrate an implementation of a Presence Option 94 for updating the presence of User A with respect to the instant messaging application 54. As seen in FIG. 15, the instant messaging application 54 comprises a message module 90, which generally represents any computer executable instructions implemented by the instant messaging application 54 for enabling a user to engage in an instant messaging session or conversation 98 with a selected contact from the IM contacts list 61. The message module 90 comprises or otherwise facilitates or controls the operation of the menu 236 that is, as described above, accessible from within the instant messaging UI 230, e.g. by selecting the menu button 24. Also shown in FIG. 15 is the Presence Option 94 which can be initiated through the menu 92 by selecting the My Status option 238 as shown in FIG. 10, also shown conceptually in FIG. 15. As will be explained in greater detail below, the Presence Option 94 can also be updated automatically, i.e. without requiring user interaction, by an IM Presence Updater module 209.

The Presence option 94 as well known in the art, is capable of indicating, updating and changing the presence of User A to notify all buddies such as those shown in FIG. 8 and any other correspondents in open conversations 98 (if not a buddy), as to the availability of User A via the instant messaging platform or client associated with the instant messaging application 54. The Presence option 94 comprises or otherwise has access to the presence status 244 that provides presence information describing the user's presence status 244 as it pertains to their general availability pertaining to instant messaging 54, including their ongoing availability in an instant messaging conversation 98. For example, one of the presence statuses 96 may be the 'Available' status 244 discussed above. Upon sensing the selection of a presence status 244, e.g. by receiving an input from the user through a user interface (UI) indicating which presence status 244 is currently applicable to them, the presence option 94 updates the presence in the instant messaging application 54, e.g. by updating the emoticon 231, which is visible to User A on the mobile device 100A and visible to Users B, C and D on their respective mobile devices 100B, 100C and 100D.

Each open conversation 98 shown in FIG. 15 is associated with a particular contact or buddy from the IM contacts list 61. The content of each conversation 98 is stored in the IM message store A 63 on an ongoing basis such that the conversation 98 may be closed and accessed later to resume the exchange with the particular user. For illustrative purposes only, three open conversations 98 are shown in FIG. 15, namely between User A and User B, between User A and User C and between User A and User D. Each conversation 98 comprises one or more messages, in this example either a PIN-to-PIN message 68 or a 3$^{rd}$ party based instant message 84, depending on which instant messaging system corresponds to the instant messaging application 54. Each conversation 98 may also have associated therewith, a presence indicator 214 which may provide for example an emoticon 231 that is associated with the currently selected presence status 244 locally on the mobile device 100A and within the conversation 98 or elsewhere in the instant messaging application 54 (e.g. instant messaging UI 230 shown in FIGS. 9 to 12), which is then sent to the other correspondents through the instant messaging application 54 as is known in the art. An Update instruction 212 can be used to update, change or confirm the presence 214 in any one or all of the open conversations 98.

As noted above, the Instant Messaging Presence Updater module 209 can also be used to change, update or confirm the presence 214 in the instant messaging application 54 and thus the open conversation 98 by instructing the Presence option 94 to generate an update instruction 212. In the example shown in FIG. 15, the Presence Updater module 209 monitors or obtains information regarding the active profile 208 selected using the profiles application 62, to automatically generate a notification 210 for the presence option 94 so that when a user changes their notification profile 260, the user's presence status 244 in the instant messaging application 54 can be updated without requiring the user to do so. It may be noted that the active profile 208 can be determined in any suitable manner. For example, the presence updater module 209 can be configured to register a "listener" with the profiles application 62. The profiles application 62 would then call a method in the presence updater module 209 when the active profile 208 changes. It will be appreciated that other mechanisms can be employed. For example, the presence updater module 209 can poll the profiles application 62 and "ask" what the currently selected profile is (the "active" profile 208). Such a polling can be done periodically and updated when appropriate.

The Presence Updater Module 209 can determine which IM presence status 244 is associated with a particular notification profile 260 in various ways. In FIG. 15, the Presence Updater Module 209 retains or otherwise has access to a set of rules 216 pertaining to the associations. The rules 216 can be predetermined and fixed or can be customizable as will be described in greater detail below. The rules 216 can also comprise default associations that are used unless otherwise changed. In this example, a default profile-presence table 218 is utilized, which comprises a first column 219 of profiles 260 with a second corresponding column 220 indicating the default (or fixed if applicable) presence status 244 for each profile 260. For example, for "Loud", "Vibrate" and "Normal" profiles 260, the presence status 244 can be automatically updated, regardless of the current presence status 244, to indicate that User A is "Available". This avoids User A having to separately access the instant messaging UI 230 to update their presence status 244 to reflect a change in notification profile 260.

As discussed above, if User A changes their notification profile 260, e.g when entering a meeting, but forgets to change his/her presence status 244 in the instant messaging application 54, the Presence Updater module 209 automatically senses or is advised of a change in the active profile 208, compares the active profile 208 to the associations indicated by the rules 216, and sends the notification 210 to trigger a change in presence 214. By doing so, the other correspondents (Users B, C and D) are properly notified such that they are not expecting messages 68 to be forthcoming unless User A is actually available.

Figures 16, 17:
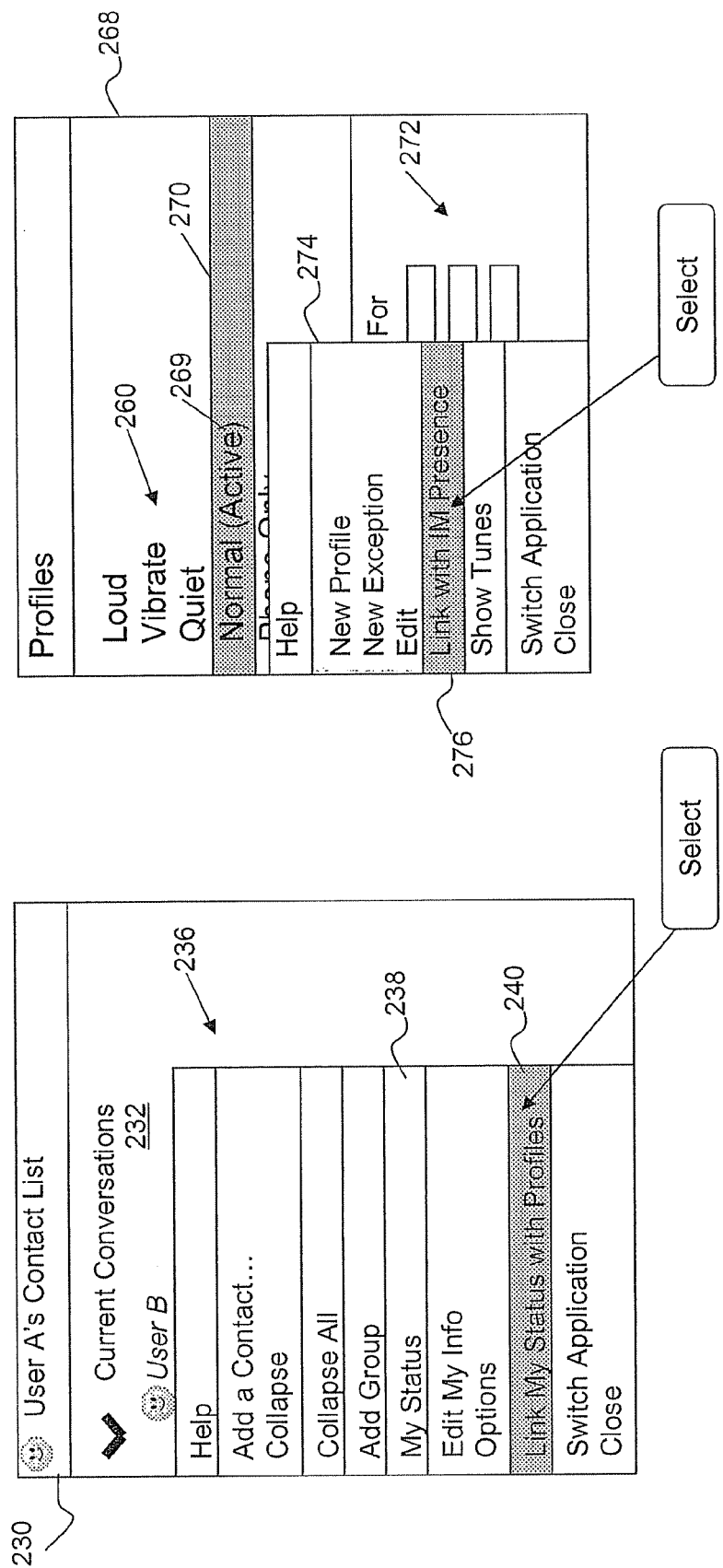
FIG. 16 is a screen shot of the menu of options shown in FIG. 10 with the Link My Status with Profiles option being highlighted.
FIG. 17 is a screen shot of the UI shown in FIG. 14 displaying a menu of options pertaining to the profiles application.
Figures 18, 19:
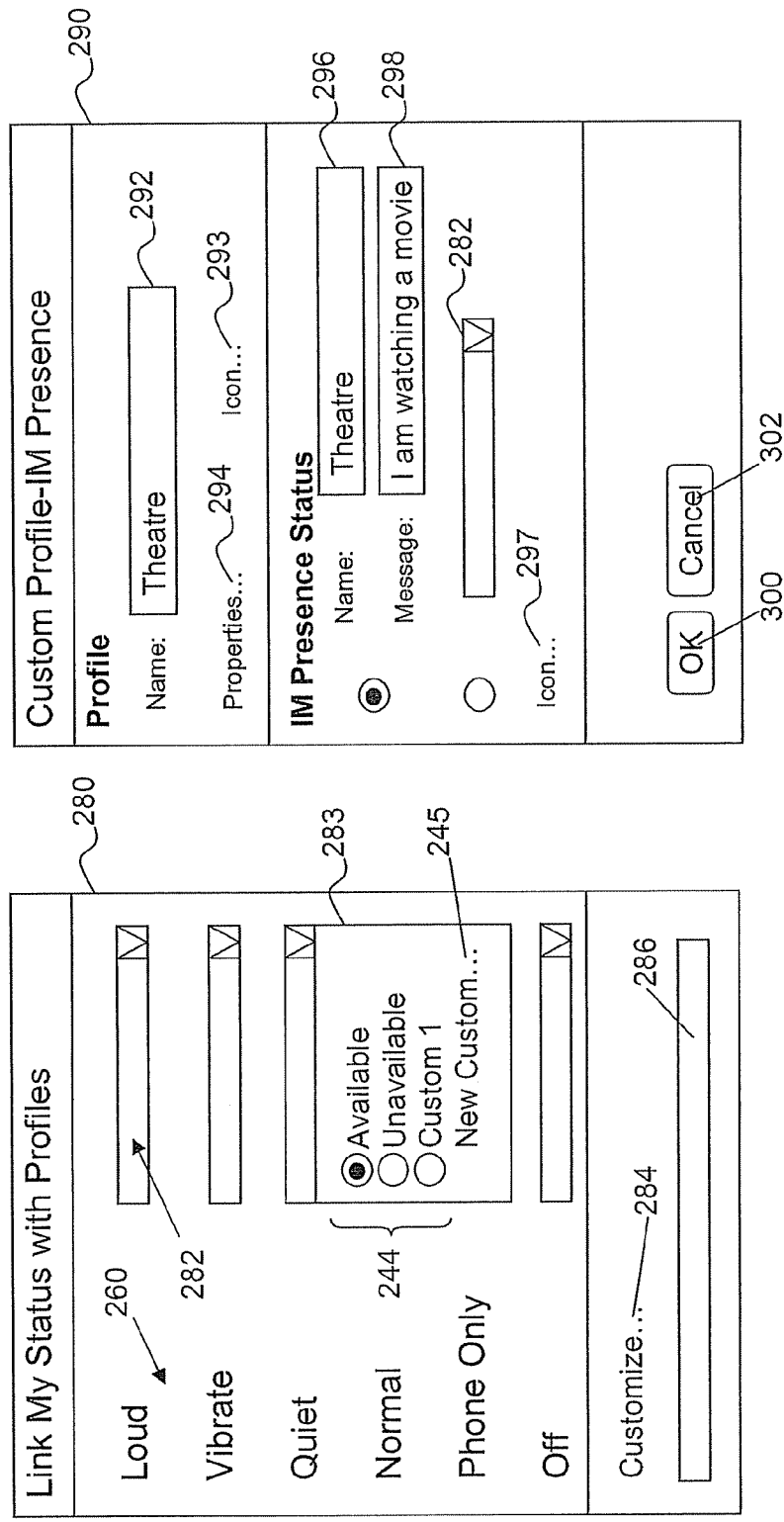
FIG. 18 is a screen shot of an example UI for the Link My Status with Profiles option shown in FIG. 16.
FIG. 19 is a screen shot of an example UI for the Customize option shown in FIG. 18.

As discussed above, the rules 216 can also be customizable such that the table 218 can be user defined to suit the user's preferences. For example, User A may still want to be seen as "Available" when in the "Quiet" profile 260 but still be seen as "Unavailable" when in the "Off" profile 260. Turning now to FIG. 16, by accessing the menu 236 and selecting the Link My Status with Profiles option 240, a Link My Status with Profiles UI 280 may be accessed by the processor 102 and displayed as shown in FIG. 18. It will be appreciated that the Link My Status with Profiles UI 280 can be accessed in other ways. For example, as shown in FIG. 17, User A may initiate a profiles menu 274 from the advanced profiles UI 268 and select a similar option, in this example a Link with IM Presence option 276. By selecting either of these options 240, 276, the Link My Status with Profiles UI 280 is displayed as shown in FIG. 18.

As can be seen in FIG. 18, associations between the profiles 260 and the presence status 244 can be specified by providing drop-down lists 282 comprising the list of presence statuses 244 and the New Custom option 245, similar to the presence selection box 242 shown in FIG. 11. In this way, the table 218 (or similar data structure used to represent the rules 216) can be modified by making selections for each notification profile 260. A Customize option 284 can also be provided for creating new custom profile/presence rules 286. The custom rules 286 enable the user to define a new profile 260 and at the same time define a custom presence status 244 or associate an existing presence status 244 with the new profile 260. In this way, as new profiles 260 are created, an IM presence status 244 can be defined at the same time so that upon adding the new profile 260, the rules 216 can be updated to reflect the new options.

FIG. 19 shows a Custom Profile-IM Presence UI 290 for creating a new profile 260 and customizing its association with presence status 244 at the same time. The new profile 260 can be given a name by entering characters into a name entry box 292, can be given an icon to distinguish the new profile 260 from existing profiles 260 by selecting an Icon option 293, and various properties for the profile 260 can be defined by selecting a Properties option 294. It will be appreciated that the Icon option 293 can comprise any suitable selection mechanism as is know in the art. Upon sensing selection of the Properties option 294, the processor 102 can be instructed to load and display a properties UI 304 as shown in FIG. 20. In the example shown in FIG. 20, the UI 304 indicates, at the top of the screen, the name that has been given to the profile per the characters entered into the entry box 292, i.e. "Theatre Properties" in this case. The properties UI 304 may be similar to an existing UI for editing existing notification profiles 260. In this example, the properties UI 304 is divided into Out of Holster properties 306 for defining the nature of the notifications when the mobile device is out of its holster, cradle or other docking mechanism; and In Holster properties 308 for defining the nature of the notifications when the mobile device is in its holster. Various other properties can be defined and thus included in the properties UI 304 and those shown in FIG. 20 are not meant to be limiting in any way but instead representative of one example. By selecting the various properties for the new profile 260, the way in which the user is alerted or notified when in that profile can be tailored to the expected use of the newly created profile 260'. For example, a profile 260 for when the user is at the theatre as herein exemplified, may simply suppress or deactivate any and all notifications such that the user is not disturbed or distracted while that profile 260 is the active profile 308.

Turning back to FIG. 19, in addition to defining the new profile's properties, the associated presence status 244 can be defined. In this example, a new presence status 244 can be created by entering a name in an entry box 296 and, if appropriate, entering an accompanying message in another entry box 298. Similar to the profile 260, an icon (e.g. emoticon 231) can be created or selected by selecting another Icon option 297. It will be appreciated that the new icon can be chosen, created or otherwise obtained in any suitable manner as is known in the art. Instead of creating a custom presence status 244 for the new profile 260 as shown in FIG. 19, the user may be given the option of selecting an existing presence status 244 using a drop-down list 282 similar to that shown in FIG. 18. It will be appreciated the drop down list 282 would not require the New Custom option 245 in this example since a custom presence status 244 can be defined directly within the UI 290. An OK button 300 can be selected to create the new profile 260 or a Cancel button 302 can be selected to discard the new creation. Upon selecting the OK button 300, the new profile 260 is created and can be accessed from the profiles UI 258 as shown in FIG. 21. In this example, a new Theatre profile 262' is added to the list of available profiles 260 and a new icon 262' that distinguishes the Theatre profile 262' from the other profiles 260 is displayed therewith. For example, a graphic showing a reel of film or a bag of popcorn can be selected or created for the Theatre profile 262' by selecting the Icon option 297 in the Custom Profile-IM Presence UI 290.

Figure 23:
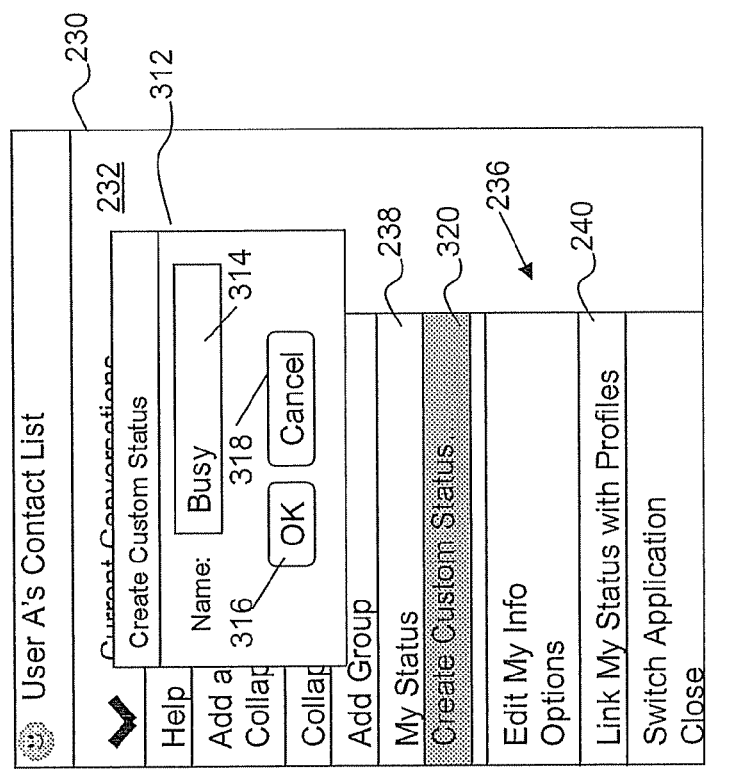
FIG. 23 is a screen shot of another menu of options displayed in the UI for the instant messaging application comprising a Create Custom Status option.
Figure 22:
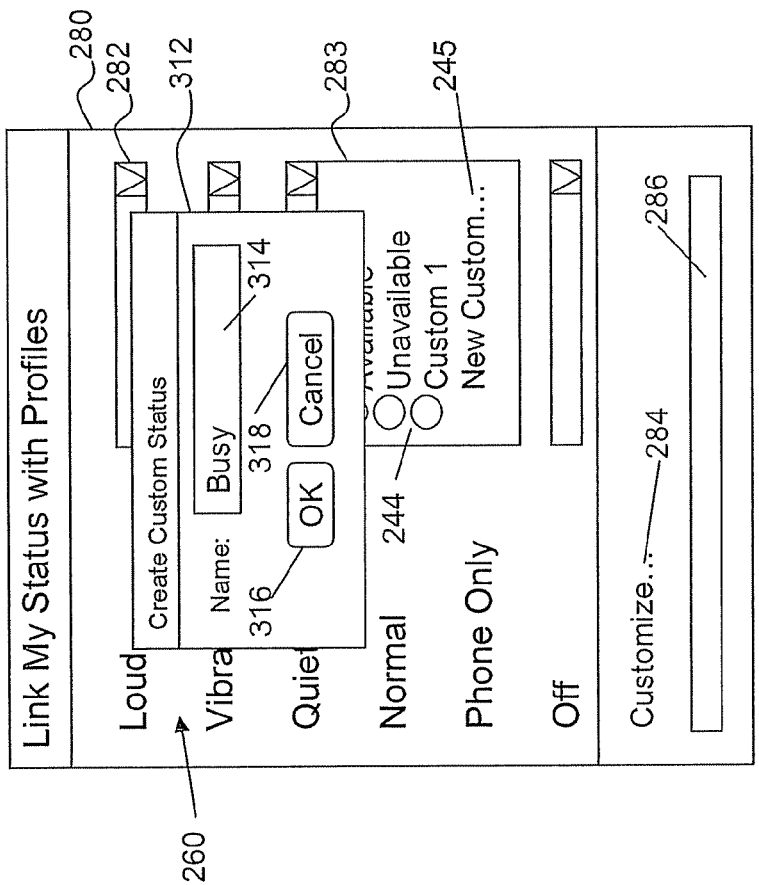
FIG. 22 is a screen shot of the UI show in FIG. 18 upon selection of the New Custom option from the drop down list for the Quiet profile.

As discussed above, the drop-down list 282, used to associated a presence status 244 with a particular profile 260, can also enable the user to define a custom presence status 244 by selecting the New Custom option 245. In this way, if the available presence statuses 244 are not deemed to be completely appropriate or applicable for that particular profile 260 the user can define a more appropriate or applicable presence status 244. Turning now to FIG. 22, upon selecting the New Custom option 245, a Create Custom Status entry window 312 can be loaded and displayed by the processor 102. The entry window 312 comprises an entry box 314 to enable the entry of characters for naming the new presence status 244 such that when the corresponding profile 260 is active, the user's IM presence indicates the custom presence status 244 that has been created. In this example, the Quiet profile 260 is chosen to be associated with the custom presence status 244 given the name "Busy", to indicate to their contacts or buddies that they are currently busy. This may be preferable to "Unavailable" since the user may still be able to respond but, in the absence of auditory alerts, they may not respond as quickly as usual. As such, the New Custom option 245 enables a custom association to be made by the user to reflect more accurately their expected availability when using a particular notification profile 260. It will be appreciated that such custom presence statuses 244 can also be created prior to or otherwise "outside" of the Link My Status with Profiles UI 280 as shown in FIG. 23. In this embodiment, a Create Custom Status option 230 can be provided in the menu 236 such that the entry window 312 can be loaded and a new status 244 created at any time User A has access to the menu 136. This would then allow the new custom presence status 244 to be included in the list of statuses 244 for all drop-down lists 282 and during normal use of the instant messaging application 54 (e.g. for manual presence changes).

Figure 24:
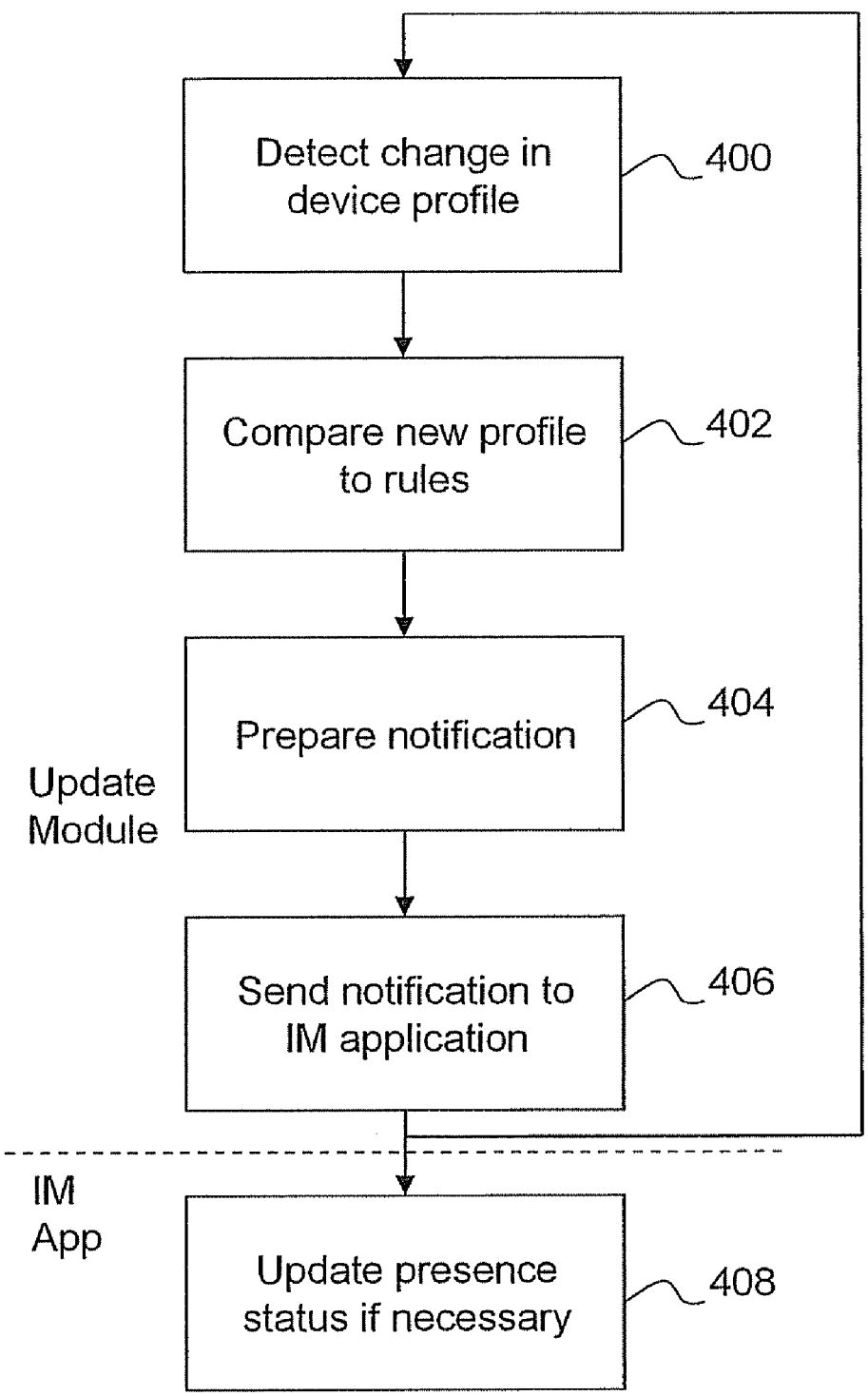
FIG. 24 is a flow diagram illustrating computer executable operations for updating presence information according to a change in device profile.

Turning now to FIG. 24, a flow chart illustrating a set of computer readable operations for running the Presence Updater Module 209 is shown. At 400, the Presence Updater Module 209 detects or is notified by the profiles application 62 of a change in the mobile device's notification profile 260. This can be done as shown in FIG. 15 by reading, extracting, or being notified of the active profile 208 for the mobile device 100, or in any other suitable manner. Using the active profile 208, at 402, the Presence Updater Module 209 then compares the active profile 208 to the rules 216 to determine the appropriate presence status 244 and prepares a notification 210 for the instant messaging application 54 at 404. The notification 210 is then sent to the instant messaging application 54 at 406. As can be seen in FIG. 24, the Presence Updater Module 209 may then repeat operations 400-404 over time. It can be appreciated that repeated "over time" may include repetition on a periodic basis, repetition performed dynamically according to an external event such as the receipt of an update of the active profile 208 from the profiles application 62, or substantially continuous repetition. Next, the instant messaging application 54 receives the notification 210 and updates the presence status 244 if necessary at 408 according to the content of the notification 210.

In the above example, the Presence Update Module 209 is responsible for accessing and examining the rules 216 in order to determine the appropriate presence status 244. Alternatively, the instant messaging application 54 could have access to the rules 216 and the determination of the appropriate presence status 244 performed by the instant messaging application 54. In this variation, the notification 210 would comprise only the active profile 208 and the instant messaging application 54 would be responsible for ascertaining whether or not an update to the presence status is required 54 based on the active profile 208. This alternative may be preferred where it is desirable to offload processing from the Presence Updater Module 209, e.g. to facilitate continuous monitoring of the active profile 208. It will be appreciated that the Presence Update Module 209, although shown as a separate module in FIG. 15 can also be incorporated into the profiles application 62, the instant messaging application 54, or any other suitable application or module such as the IT Policy Module 146 (e.g. for incorporating updates into an IT policy).

It can therefore be seen that mobile devices 100 having existing notification profiles 260 can use the active notification profile 208 in order to automatically update the user's presence status 244 in an instant messaging application 54. In other words, by associating instant messaging presence statuses 244 with existing notification profiles 260, as well as new notification profiles that are created 260', a method can be employed to detect changes in the active notification profile 208, determine the corresponding presence status 244 through such associations, and then automatically update the instant messaging presence status 244. In this way, if the active notification profile 208 is changed due to a sudden change in environment, there is no requirement to also access the instant messaging application 54 and change the presence status 244 separately.

It will be appreciated that the particular options, outcomes, applications, screen shots and icons shown in the figures and described above are for illustrative purposes only and many other variations can be used according to the principles described.

Although the above has been described with reference to certain specific embodiments, various modifications thereof will be apparent to those skilled in the art as outlined in the appended claims.

The invention claimed is:

1. A method of controlling presence status on a mobile device, said method comprising:
   determining an active one of a plurality of notification profiles for said mobile device, said notification profiles defining how said mobile device notifies of new events;
   determining a corresponding one of a plurality of instant messaging presence statuses said active one of said notification profiles; and setting said one of said plurality of instant messaging corresponding presence statuses as a current instant messaging presence status.

2. The method according to claim 1, further comprising providing a set of one or more rules indicating associations between said plurality of notification profiles and said plurality of instant messaging presence statuses, each rule correlating one of said plurality of notification profiles with a selected one of said plurality of instant messaging presence statuses, said determining a corresponding instant messaging presence status comprising referencing said rules.

3. The method according to claim 2, said rules comprising predefined default associations, said predefined default associations being changeable using a first user interface displayed on a display of said mobile device.

4. The method according to claim 1 further comprising: displaying a first user interface on a display of said mobile device for selecting instant messaging presence statuses for said plurality of notification profiles.

5. The method according to claim 4, said first user interface comprising a list of said plurality of notification profiles for said mobile device and providing a selection mechanism for each profile in said list to enable said selected one of said plurality of instant messaging presence statuses for each notification profile to be chosen using said selection mechanism.

6. The method according to claim 5, said selection mechanism further comprising a first option for creating a custom presence status, said custom presence status to be automatically associated with the corresponding notification profile upon creation thereof.

7. The method according to claim 4, said first user interface further comprising a second option for creating a custom profile, said method further comprising: upon detecting selection of said second option, displaying a second user interface for creating said custom profile, said second user interface enabling one of said plurality of instant messaging presence statuses to be associated with said custom profile.

8. The method according to claim 1 being executed on said mobile device repeatedly over time.

9. The method according to claim 8, said method being executed according to any one or more of the following patterns: periodically, continuously, and dynamically according to sensing an external event indicative of a change in said active one of said plurality of notification profiles.

10. The method according to claim 1, further comprising providing a notification pertaining to said corresponding presence status for said active one of said plurality of notification profiles.

11. The method according to claim 10, said active one of said plurality of notification profiles being determined by communicating with a profiles application stored on said mobile device, and said active one of said notification profiles being provided to an instant messaging application using a presence updater module.

12. The method according to claim 10, said method being performed by an instant messaging application, said active one of said plurality of notification profiles being determined from an initial notification prepared according to information provided by a profiles application on said mobile device, and said active one of said notification profiles comprising an update generated by said instant messaging application.

13. The method according to claim 1, said setting said current instant messaging presence status further comprising: comparing said corresponding instant messaging presence status to said current instant messaging presence status; and if said corresponding instant messaging presence status is different than said current instant messaging presence status, updating said instant messaging current presence status to be the same as said corresponding instant messaging presence status.

14. A mobile device comprising a display, a processor, one or more input mechanisms and a memory comprising computer executable instructions for controlling presence status on a mobile device, said computer executable instructions comprising instructions for: determining an active one of a plurality of notification profiles for said mobile device, said notification profiles defining how said mobile device notifies of new events; determining a corresponding one of a plurality of instant messaging presence statuses that is associated with said active one of said notification profiles; and setting said corresponding one of said plurality of instant messaging presence statuses as a current instant messaging presence status.

15. The mobile device according to claim 14, further comprising instructions for providing a set of one or more rules indicating associations between said plurality of notification profiles and said plurality of instant messaging presence statuses, each rule correlating one of said plurality of notification profiles with a selected one of said plurality of instant messaging presence statuses, said determining a corresponding instant messaging presence status comprising referencing said rules.

16. The mobile device according to claim 15, said rules comprising predefined default associations, said predefined default associations being changeable using a first user interface displayed on a display of said mobile device.

17. The mobile device according to claim 14 further comprising instructions for: displaying a first user interface on a display of said mobile device for selecting instant messaging presence statuses for said plurality of notification profiles.

18. The mobile device according to claim 17, said first user interface comprising a list of said plurality of notification profiles for said mobile device and providing a selection mechanism for each profile in said list to enable said selected one of said plurality of instant messaging presence statuses for each notification profile to be chosen using said selection mechanism.

19. The mobile device according to claim 18, said selection mechanism further comprising a first option for creating a custom presence status, said custom presence status to be automatically associated with the corresponding notification profile upon creation thereof.

20. The mobile device according to claim 18, said first user interface further comprising a second option for creating a custom profile, said computer executable instructions further comprising instructions for: upon said detecting selection of said second option, displaying a second user interface for creating said custom profile, said second user interface enabling one of said plurality of instant messaging presence statuses to be associated with said custom profile.

21. The mobile device according to claim 14, said instructions being executed on said mobile device repeatedly over time.

22. The mobile device according to claim 21, said instructions being executed according to any one or more of the following patterns: periodically, continuously, and dynamically according to sensing an external event indicative of a change in said active one of said plurality of notification profiles.

23. The mobile device according to claim 14, further comprising instructions for providing a notification pertaining to said corresponding presence status for said active one of said plurality of notification profiles.

24. The mobile device according to claim 23, said active one of said plurality of notification profiles being determined by communicating with a profiles application stored on said mobile device, and said active one of said notification profiles provided to an instant messaging application using a presence updater module.

25. The mobile device according to claim 23, said instructions being performed by an instant messaging application, said active one of said plurality of notification profiles being determined from an initial notification prepared according to information provided by a profiles application on said mobile device, and said active one of said notification profiles comprising an update generated by said instant messaging application.

26. The mobile device according to claim 14, said setting said current instant messaging presence status further comprising instructions for: comparing said corresponding instant messaging presence status to said current instant messaging presence status; and if said corresponding instant messaging presence status is different than said current instant messaging presence status, updating said current instant messaging presence status to be the same as said corresponding instant messaging presence status.

27. A non-transitory computer readable medium comprising computer executable instructions for controlling presence status on a mobile device, said computer executable instructions comprising instructions for: determining an active one of a plurality of notification profiles for said mobile device, said notification profiles defining how said mobile device notifies of new events; determining a corresponding one of a plurality instant messaging presence statuses that is associated with said active one of said notification profiles; and setting said corresponding one of said plurality of instant messaging presence status as a current instant messaging presence status.

* * * * *